(12) United States Patent
Lake

(10) Patent No.: US 11,111,667 B2
(45) Date of Patent: Sep. 7, 2021

(54) ELONGATE STRUCTURAL ELEMENT, A BRACKET AND AN ELONGATE STRUCTURAL SECTION

(71) Applicant: STONELAKE PTY. LTD., Coffs Harbour (AU)

(72) Inventor: Maurice Lake, Toormina (AU)

(73) Assignee: Stonelake Pty. Ltd., Coffs Harbour (AU)

( * ) Notice: Subject to any disclaimer, the term of this patent is extended or adjusted under 35 U.S.C. 154(b) by 0 days.

(21) Appl. No.: 16/735,509

(22) Filed: Jan. 6, 2020

(65) Prior Publication Data

US 2020/0157804 A1 May 21, 2020

Related U.S. Application Data

(62) Division of application No. 15/557,222, filed as application No. PCT/AU2016/000072 on Mar. 8, 2016, now Pat. No. 10,533,319.

(30) Foreign Application Priority Data

Mar. 11, 2015 (AU) .................... 2015900856

(51) Int. Cl.
*E04B 2/62* (2006.01)
*E04C 3/32* (2006.01)
(Continued)

(52) U.S. Cl.
CPC ............. *E04B 2/62* (2013.01); *E04B 1/2403* (2013.01); *E04C 3/04* (2013.01); *E04C 3/06* (2013.01); *E04C 3/32* (2013.01); *E04B 2001/2412* (2013.01); *E04B 2001/2415* (2013.01); *E04B 2001/2451* (2013.01); *E04B 2001/2457* (2013.01); *E04B 2001/2472* (2013.01);
(Continued)

(58) Field of Classification Search
CPC ..... E04C 3/06; E04C 3/32; E04C 3/04; E04B 1/2403; E04B 2001/2415; F16B 7/0446; F16B 7/18
USPC .................. 52/36.4, 36.5, 282.1, 282.2, 598
See application file for complete search history.

(56) References Cited

U.S. PATENT DOCUMENTS 2,049,907 A   8/1936  Hess
3,081,579 A   3/1963  Pelley
(Continued)

FOREIGN PATENT DOCUMENTS

GB       504405 A    4/1939
GB       591110 A    8/1947
(Continued)

OTHER PUBLICATIONS

The International Search Report for International Patent Application No. PCT/AU2016/000072 dated May 9, 2016.

*Primary Examiner* — Brian E Glessner
*Assistant Examiner* — Adam G Barlow
(74) *Attorney, Agent, or Firm* — Quarles & Brady LLP

(57) ABSTRACT

A bracket is combined with a rail that is to be attached to an elongate structural element by the bracket. The bracket includes a body and a bolt. The body is configured for attachment to the elongate structural element. The body defines a shoulder from which the rail is attached so that the rail is connected to the element. The bolt is engaged with the rail and is movable to engage the body. The body has a threaded passage to engage the bolt to fix the rail to the body.

18 Claims, 24 Drawing Sheets

(51) Int. Cl.
  *E04B 1/24* (2006.01)
  *E04C 3/06* (2006.01)
  *E04C 3/04* (2006.01)
  *F16B 7/04* (2006.01)
  *F16B 7/18* (2006.01)

(52) U.S. Cl.
  CPC ............ *E04B 2001/2475* (2013.01); *E04C 2003/0417* (2013.01); *E04C 2003/0439* (2013.01); *E04C 2003/0465* (2013.01); *F16B 7/0446* (2013.01); *F16B 7/18* (2013.01)

(56) References Cited

U.S. PATENT DOCUMENTS

| | | | |
|---|---|---|---|
| 3,436,885 A | 4/1969 | Rothermel | |
| 3,959,943 A | 6/1976 | Shea et al. | |
| 4,860,985 A * | 8/1989 | Olson | F21V 21/116 248/229.17 |
| 4,917,338 A * | 4/1990 | Olson | F21V 21/116 248/214 |
| 4,973,796 A | 11/1990 | Dougherty et al. | |
| 6,003,274 A | 12/1999 | Wycech | |
| 6,041,823 A * | 3/2000 | Kusama | F16B 2/10 138/99 |
| 6,357,709 B1 * | 3/2002 | Parduhn | F21V 21/116 248/214 |
| 6,698,155 B2 | 3/2004 | Menendez | |
| 7,418,807 B1 | 9/2008 | Ryan et al. | |
| 7,836,657 B1 | 11/2010 | diGirolamo et al. | |
| 8,240,095 B1 | 8/2012 | Meyer | |
| 8,881,469 B1 | 11/2014 | Meyer | |
| 9,010,070 B2 | 4/2015 | Darr, III et al. | |
| 9,599,275 B1 * | 3/2017 | Parduhn | F21V 21/116 |
| 10,024,059 B2 | 7/2018 | Mitchell et al. | |
| 10,024,492 B1 * | 7/2018 | George | F16B 7/04 |
| 2004/0139684 A1 | 7/2004 | Menendez | |
| 2004/0255543 A1 | 12/2004 | Ubilla | |
| 2005/0166524 A1 | 8/2005 | Attalla | |
| 2008/0317988 A1 | 12/2008 | Mooijman et al. | |
| 2010/0096510 A1 * | 4/2010 | Oh | F16L 3/00 248/62 |
| 2010/0281821 A1 | 11/2010 | Frobosilo | |
| 2014/0252178 A1 | 9/2014 | Myers | |
| 2016/0024805 A1 | 1/2016 | Graziano | |
| 2018/0058067 A1 | 3/2018 | Lake | |
| 2018/0171634 A1 | 6/2018 | Mitchell et al. | |

FOREIGN PATENT DOCUMENTS

| | | |
|---|---|---|
| GB | 1421458 A | 1/1976 |
| JP | 7-127765 | 5/1995 |

* cited by examiner

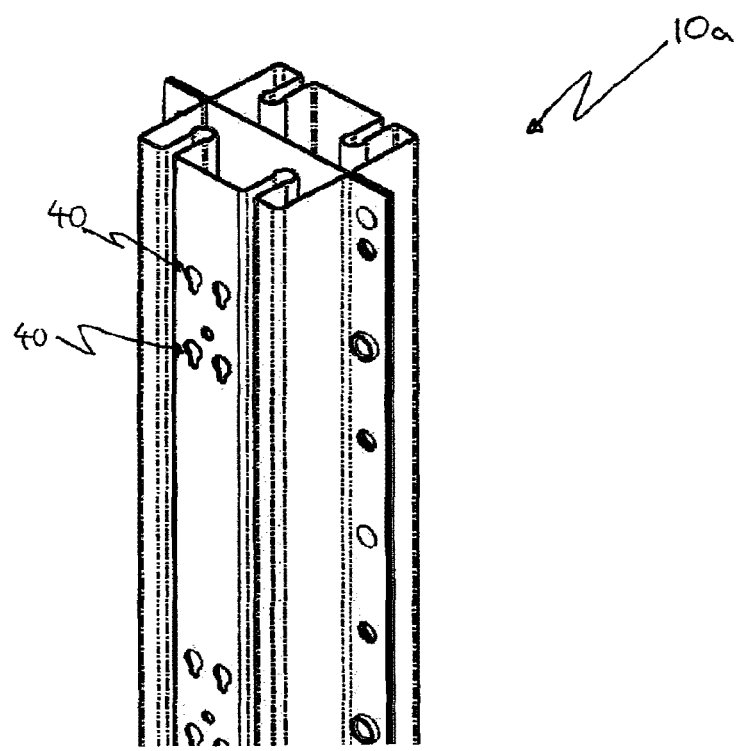
Fig. 4.1
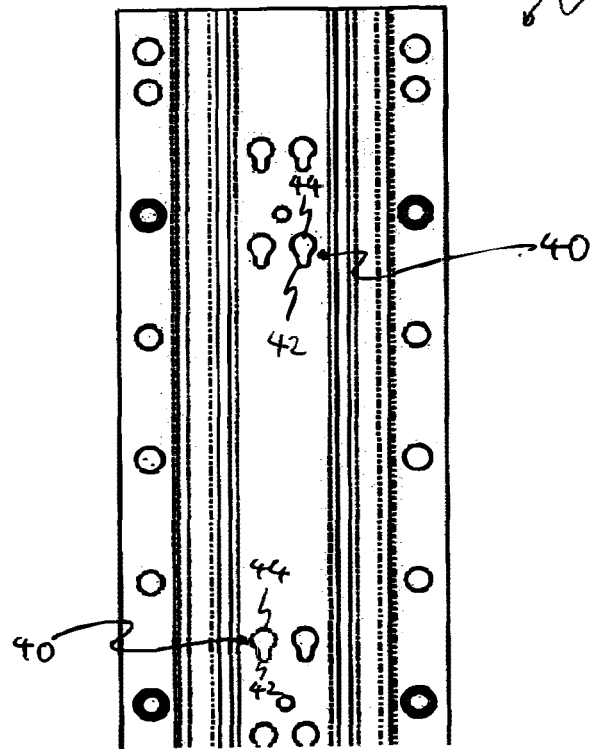
Fig. 4.2

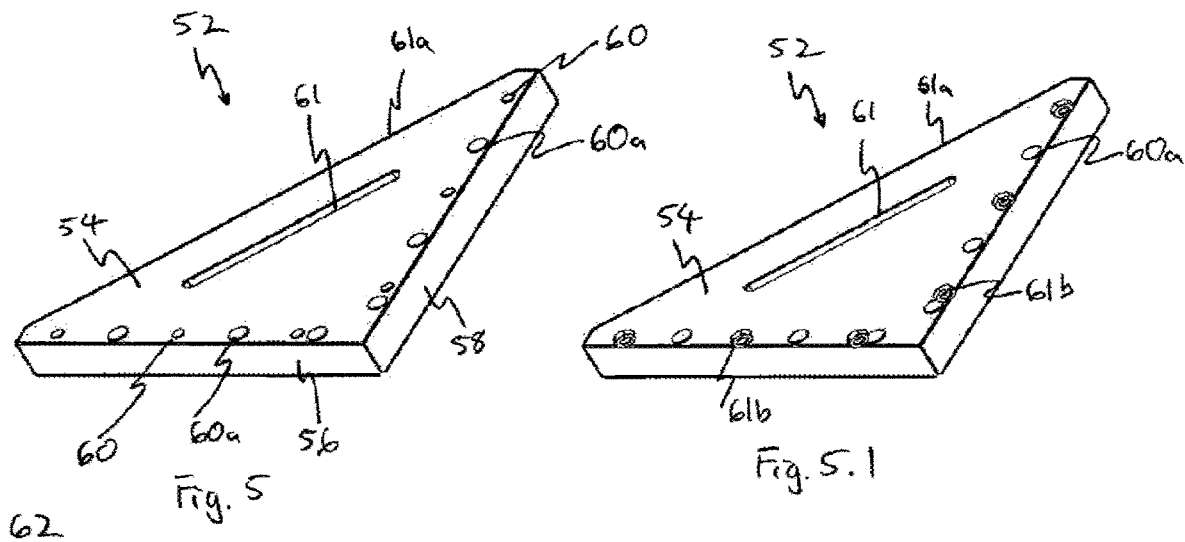
Fig. 5        Fig. 5.1
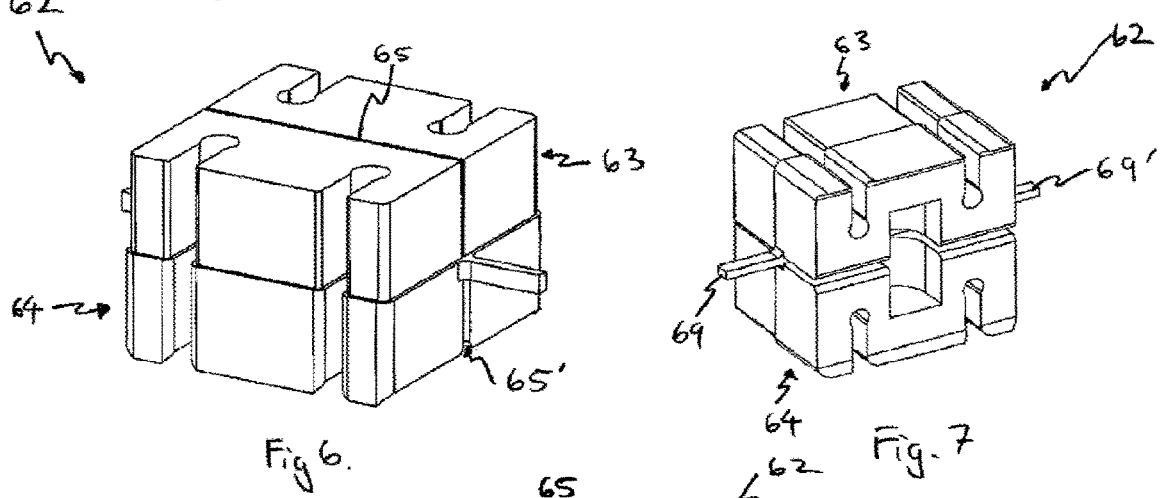
Fig. 6.        Fig. 7.
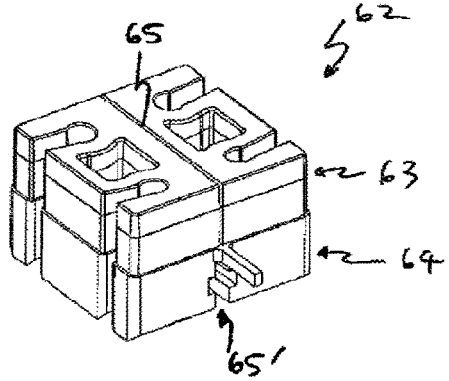
Fig. 7.1

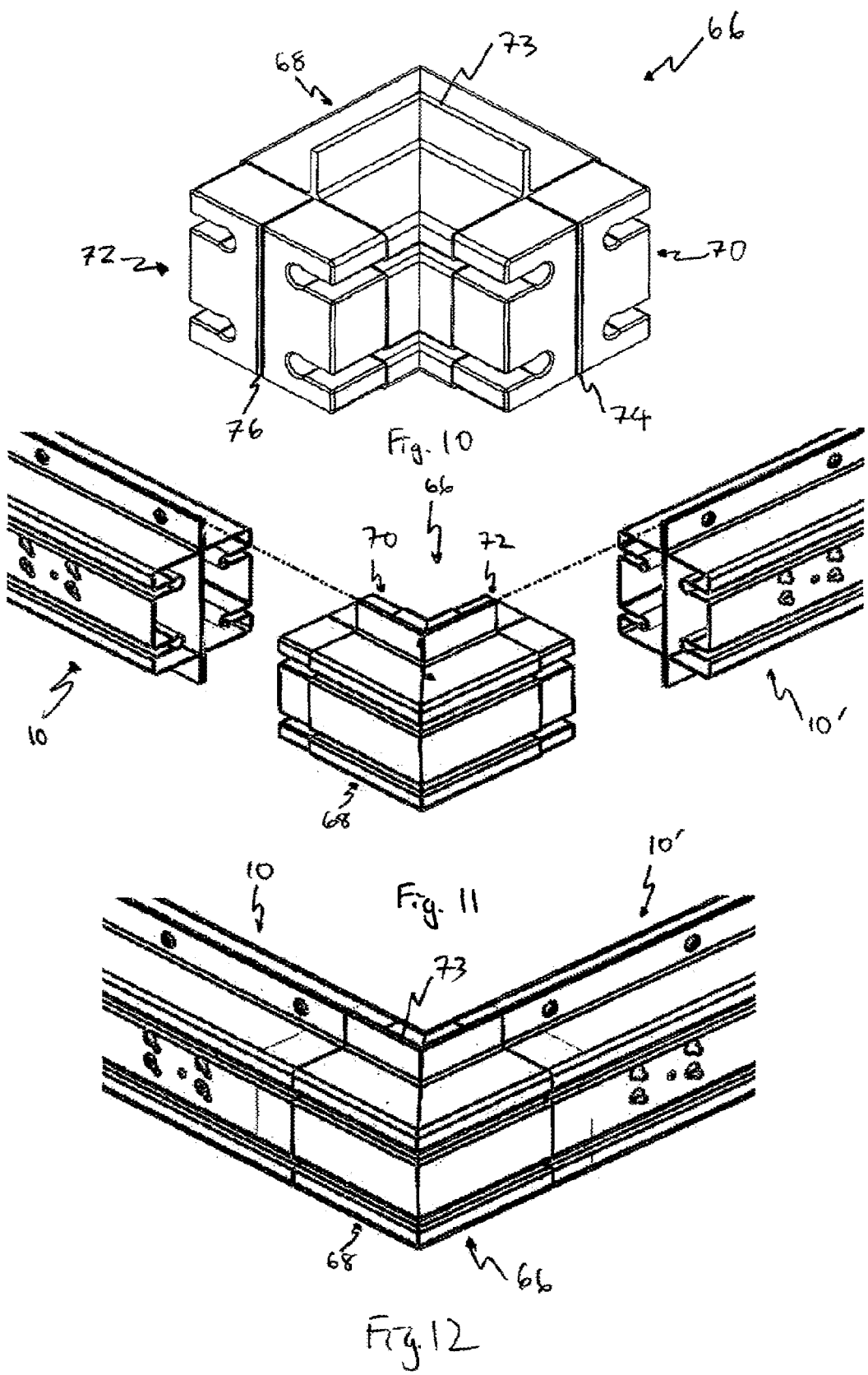

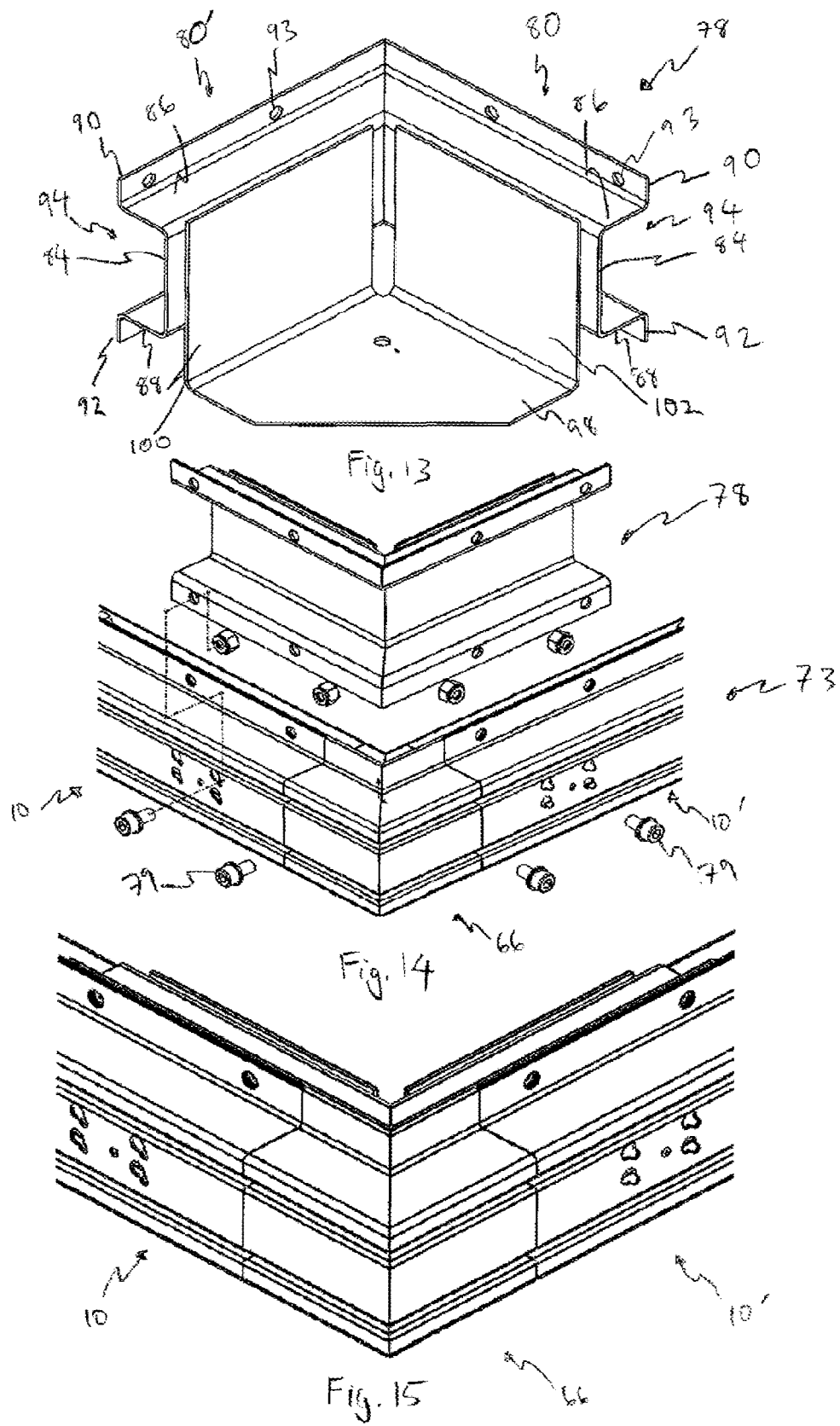

Fig. 18.1

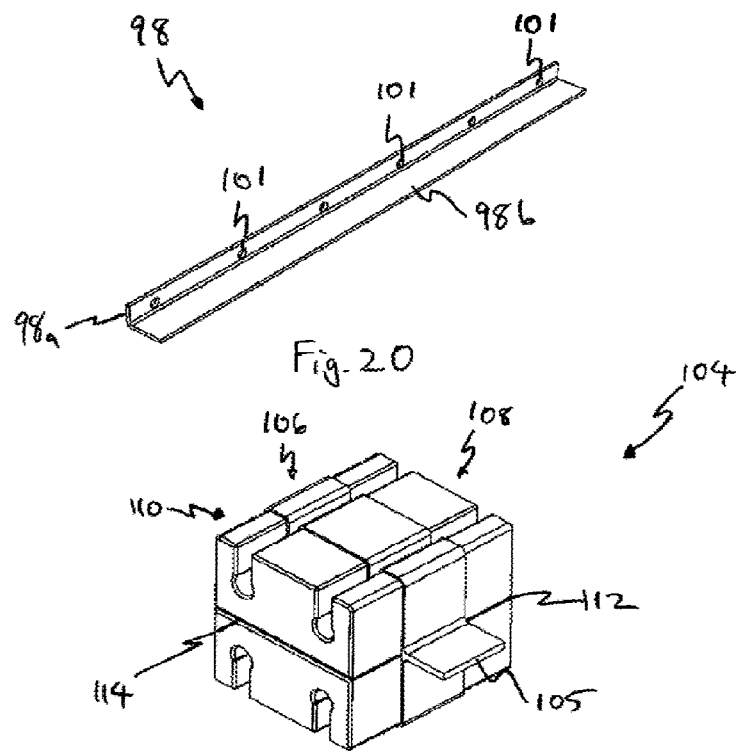
Fig-20
Fig-21
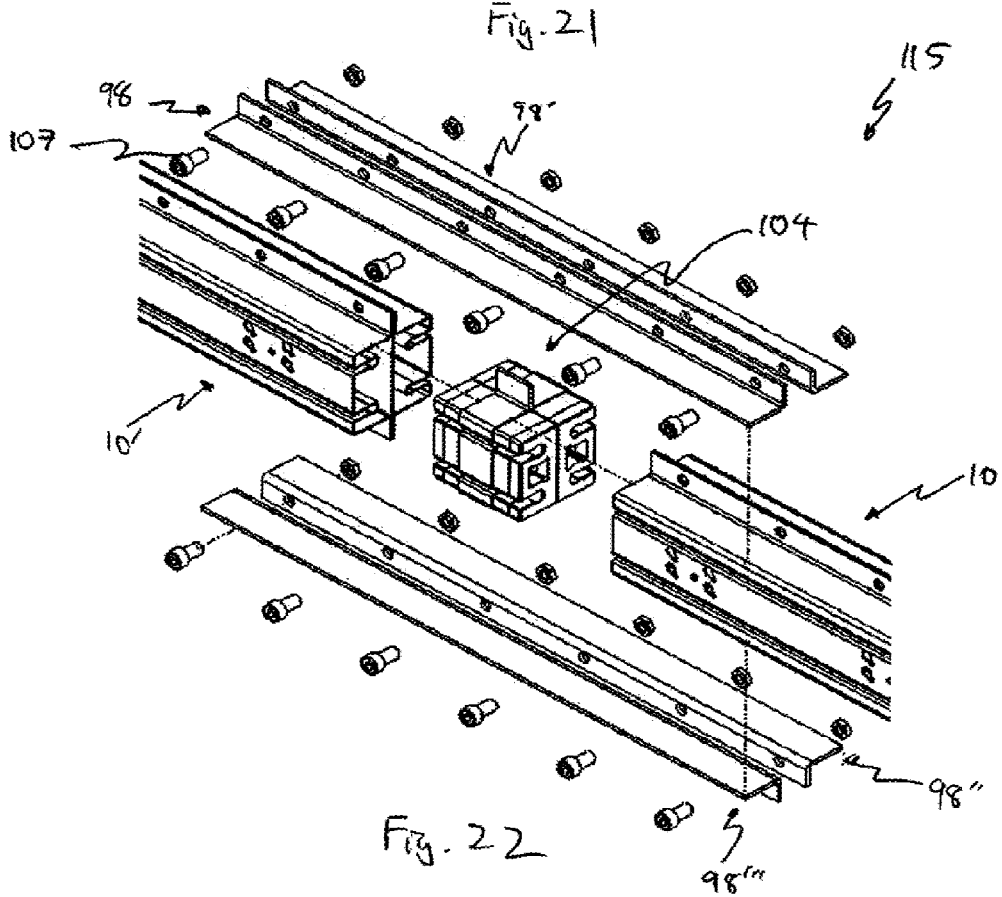
Fig-22

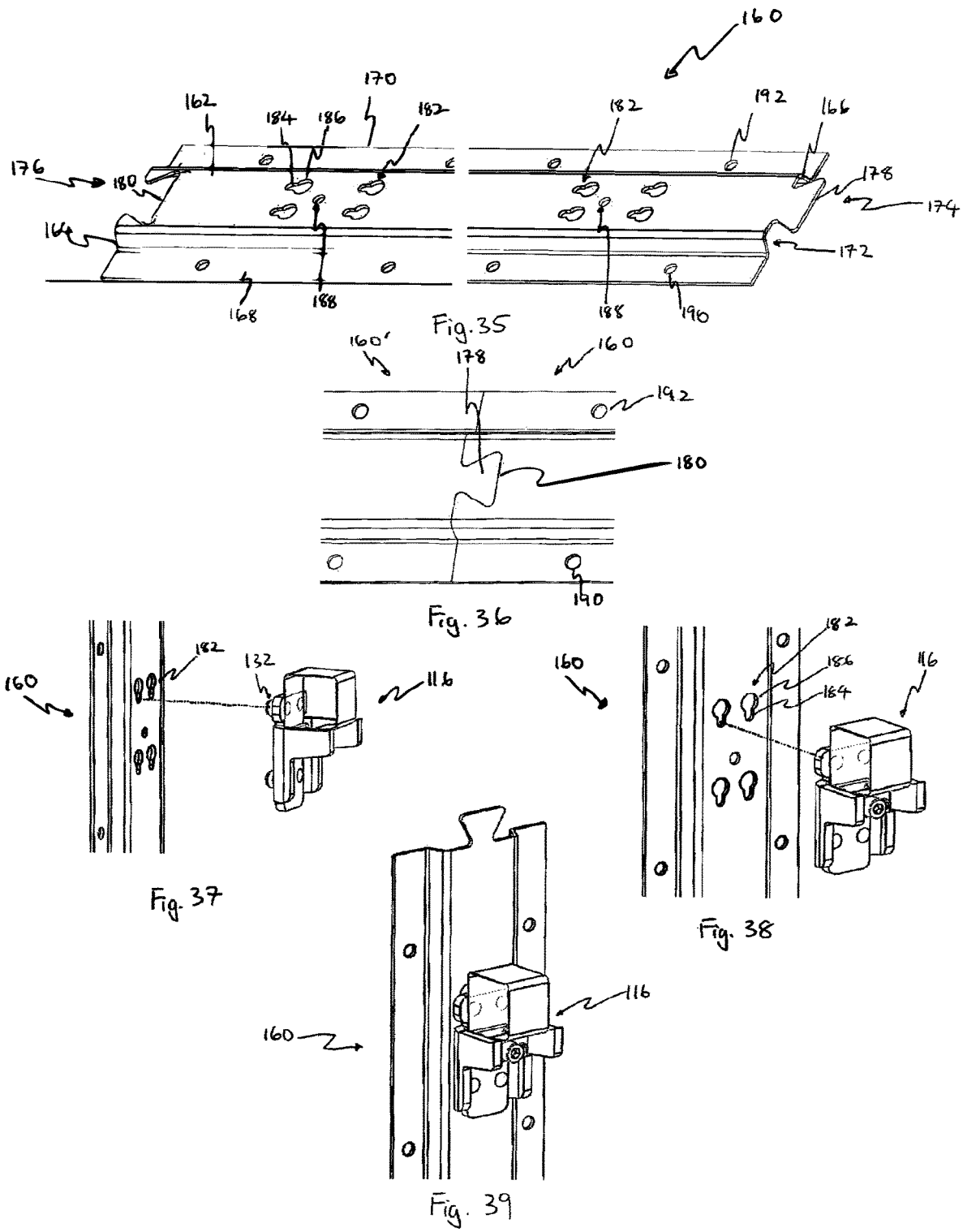

ELONGATE STRUCTURAL ELEMENT, A BRACKET AND AN ELONGATE STRUCTURAL SECTION

CROSS-REFERENCE TO RELATED APPLICATIONS

This application is a divisional of U.S. patent application Ser. No. 15/557,222, which represents the U.S. National Stage of International Application No. PCT/AU2016/000072, filed Mar. 8, 2016, which is based on, claims priority to, and incorporates herein by reference in its entirety, Australian Patent Application Serial No. 2015900856, filed Mar. 11, 2015, and entitled, "An Elongate Structural Element, A Bracket and an Elongate Structural Section."

FIELD

The present disclosure relates to an elongate structural element, a bracket and an elongate structural section.

The present disclosure has been developed primarily for use in constructing a structural frame of a building (including multi-storey buildings) and will be described hereinafter with reference to this application. However, it will be appreciated that the present disclosure is not limited to this particular field of use and is also suitable for constructing other structures, such as stand-alone facades, bridges, walkways, shelving/racking, structural boxes, fences and artwork displays. It will also be appreciated that the present disclosure can be used in conjunction with concrete slabs and existing buildings.

BACKGROUND

During the construction of a conventional building, various structural components are assembled together to form a structural frame. Typically, on-site, each individual structural component is cut to size and then connected to each other by welds, bolts, screws, and/or nails. However, this cutting and joining process is quite labour intensive and requires people with considerable skill to carry out. Further, once the structural frame is assembled, it is often difficult or impossible to disassemble the structural frame such that the structural components can be reused. It is also often difficult to connect additional structural components to the assembled structural frame.

Given the ever increasing cost of labour/materials and the increasing demand for buildings, there is a need for structural components that can be easily and quickly assembled together by people with relatively little skill. There is also a need for structural components that can be readily assembled and disassembled so that they can be reused. There is also a need for structural components that, once assembled, allow for additional structural components to be readily connected thereto. There is also a need for structural components to be readily fabricated and prefinished in a factory using robotic technology. There is also a need for structural components that allow or enable buildings to be readily designed and ordered via a web based system. There is also a need for structural components that allow for sustainable building.

OBJECT

It is the object of the present disclosure to substantially address one or more of the above needs, or at least provide a useful alternative.

SUMMARY

There is disclosed an elongate structural element, including: an inner plate having first and second opposing planar surfaces; and first and second outer sections, each of the outer sections comprising: a central wall having a pair of longitudinal grooves; a pair of side walls extending from the central wall to define a generally U-shaped channel, the longitudinal grooves depressing into the U-shaped channel; and a pair of flanges respectively extending outwardly from the pair of side walls, wherein the flanges of the first outer section are attached to the first planar surface of the plate and the flanges of the second outer section are attached to the second planar surface of the plate such that the U-shaped channels are substantially closed by the inner plate and opposed to each other.

Each of the grooves preferably comprises a profile with an open narrow region and an enlarged end region. Preferably, the profile of each groove is generally keyhole shaped.

The grooves of the first outer section are preferably substantially parallel with each other, and the grooves of the second outer section are substantially parallel with each other.

The grooves of the first outer section are preferably respectively substantially aligned with the grooves of the second outer section.

The grooves of the first outer section are preferably substantially coextensive with each other, and the grooves of the second outer section are substantially coextensive with each other.

Each of the central walls preferably comprises at least one aperture. Preferably, each of the apertures is generally keyhole shaped with a narrowed region and an enlarged region. In each of the keyhole shaped apertures, the narrowed region preferably extends from the enlarged region substantially parallel to a longitudinal axis of the elongate structural element. In each of the keyhole shaped apertures, the narrowed region preferably extends from the enlarged region at an angle with a longitudinal axis of the elongate structural element. The angle is preferably between 0 to 90 degrees. The angle is preferably about 45 degrees. In each of the outer sections, the narrowed regions of the keyhole shaped apertures preferably respectively extend from the enlarged regions of the keyhole shaped apertures in generally the same direction.

Preferably, each of the apertures is generally rectangular in shape.

The first and second outer sections are preferably substantially coterminous with the inner plate.

The flanges of the first outer section and the flanges of the second outer section are preferably respectively attached to the first and second planar surfaces of the inner plate by: rivets, metal glue, seam welding, spot welding, or a combination thereof.

The first and second outer sections are preferably respectively formed from a sheet of metal, plastic, carbon fiber or a combination thereof.

Preferably, the element is formed by cast extrusion.

The inner plate is preferably formed from a sheet of metal, plastic, carbon fiber or a combination thereof.

The side walls of the first outer section are preferably respectively aligned with the side walls of the second outer section.

The central wall of the first outer section is preferably substantially parallel to the central wall of the second outer section.

The elongate structural element preferably further comprises a plurality of attachment apertures extending through the inner plate and the flanges of the first and second outer sections.

There is also disclosed herein an elongate structural section, including: a central wall having first and second ends; a pair of side walls extending from the central wall to define a generally U-shaped channel; and a pair of flanges respectively extending outwardly from the pair of side walls, wherein the first end has a male portion and the second end has a female portion configured to receive the male portion of a further elongate structural section such that the elongate structural section is longitudinally attached and aligned with the further elongate structural section.

The male portion is preferably trapezoidal in shape. The female portion is preferably a recess corresponding to the shape of the male portion.

The central wall preferably comprises at least one aperture. Preferably, each of the apertures is generally keyhole shaped with a narrowed region and an enlarged region. The narrowed region preferably extends from the enlarged region substantially parallel to a longitudinal axis of the elongate structural section. The narrowed region preferably extends from the enlarged region substantially at an angle with a longitudinal axis of the elongate structural section. The angle is preferably between 0 to 90 degrees. The angle is preferably about 45 degrees.

Preferably, each of the apertures is generally rectangular shaped.

There is also disclosed herein a bracket for connecting a rail to an elongate structural element, the bracket including: a body configured for attachment to the elongate structural element, the body defining a shoulder for supporting the rail thereon; a strap configured for wrapping around the rail, the strap having first and second ends, the first end being secured to the body; and a bolt configured for attaching the second end to the body and also for fixing the location of the body relative to the elongate structural element.

The bolt is preferably further configured for adjusting a distance between the first end and the second end to adjustably apply tension to the strap.

The bracket preferably further comprises a bolt aperture for receiving the bolt therethrough, the bolt aperture extending through at least the second end and the body. Preferably, the bolt aperture also extends through the first end.

The bolt is preferably receivable into an apeliure of the elongate structural element.

The strap preferably comprises a sheet-like material. The sheet-like material preferably has a thickness between 0.05 to 0.5 mm. The thickness of the sheet-like material is preferably between 0.125 to 0.33 mm. The sheet-like material is preferably formed from a metal. When the second end is preferably attached to the body by the bolt, the strap defines a rail aperture for holding the rail therein. The rail aperture preferably has a profile substantially corresponding with an outer profile of the rail. The profile of the rail aperture is preferably generally square, rectangular, or circular shaped.

The body preferably comprises a plate and at least one arm member extending outwardly therefrom defining the shoulder. The arm member preferably has a surface for abutment with the rail, the surface being substantially perpendicular to the plate. The arm member is preferably integrally formed with the plate. The plate preferably comprises two end portions and the surface of the arm member is located between the two end portions. The body preferably comprises two of said arm members. The body preferably further comprises at least one protrusion extending from the plate portion and being receivable into another aperture of the elongate structural element for attachment. The protrusion is preferably a slot pin comprising a narrow portion and an enlarged end portion. Preferably, the protrusion comprises a first part extending from the plate and a second part extending from a free end of the first part to define a recess therebetween for receiving a portion of the elongate structural element.

In another aspect, a bracket connects to a rail to an elongate structural element. The bracket includes a body, a strap, and a bolt. The body is configured for attachment to the elongate structural element. The body defines a shoulder for supporting the rail thereon. The strap is configured for wrapping around the rail. The strap has first and second ends, the first end being secured to the body. The bolt is configured for attaching the second end to the body and also for fixing the location of the body relative to the elongate structural element.

In yet another aspect, a bracket is combined with a rail that is to be attached to an elongate structural element by the bracket. The bracket includes a body and a bolt. The body is configured for attachment to the elongate structural element. The body defines a shoulder from which the rail is attached so that the rail is connected to the element. The bolt is engaged with the rail and is movable to engage the body. The body has a threaded passage to engage the bolt to fix the rail to the body.

BRIEF DESCRIPTION OF THE DRAWINGS

Preferred embodiments of the present disclosure will now be described, by way of examples only, with reference to the accompanying drawings, wherein:

FIG. 4.1 is a perspective view of another embodiment of an elongate structural element;

FIG. 4.2 is a top view of the elongate structural element of FIG. 4.1;

FIG. 5 is a perspective view of a triangular bracing/support member without bolt nuts attached;

FIG. 5.1 is a perspective view of the triangular bracing/support member of FIG. 5 with the bolt nuts attached;

FIG. 6 is a perspective view of an end-to-side interconnection spacer;

FIG. 7 is another perspective view of the end-to-side interconnection spacer of FIG. 6;

FIG. 7.1 is a perspective view of another embodiment of an end-to-side interconnection spacer;

FIG. 10 is a perspective view of a corner interconnection spacer;

FIG. 11 is an exploded view of a corner connection of two elongate structural elements of FIG. 1 and the corner interconnection spacer of FIG. 10;

FIG. 12 is a perspective view of the corner connection of FIG. 11; FIG. 13 is a perspective view of a corner bracket;

FIG. 14 is an exploded view of the corner connection of FIG. 12 and the corner bracket of FIG. 13;

FIG. 15 is a perspective view of the corner connection of FIG. 14;

FIG. 18.1 is a perspective view of the corner stiffening members of FIG. 18;

FIG. 20 is a perspective view of a stiffening rail member;

FIG. 21 is a perspective view of an end-to-end interconnection spacer;

FIG. 22 is an exploded view of a straight connection of two elongate structural elements of FIG. 1, the end-to-end interconnection spacer of FIG. 21 and four of the stiffening rail members of FIG. 20;

FIG. 35 is a perspective view of an embodiment of an elongate structural section;

FIG. 36 is a perspective view of an interconnection of two elongate structural sections of FIG. 35;

FIG. 37 is an exploded view of a connection of the elongate structural section of FIG. 35 and the bracket of FIG. 24;

FIG. 38 is another exploded view of the connection of FIG. 37;

FIG. 39 is a perspective view of the connection of FIG. 37;

DESCRIPTION

FIGS. 1 to 4 show an embodiment of an elongate structural element 10 for constructing a structural frame of a building. The element 10 includes an inner plate 12 having first 14 and second 16 opposing planar surfaces. The inner plate 12 is formed from a sheet of steel. It will be appreciated, however, that the inner plate 12 may also be formed from a sheet of aluminium, plastic, carbon fibre, or a combination thereof.

Figure 3:
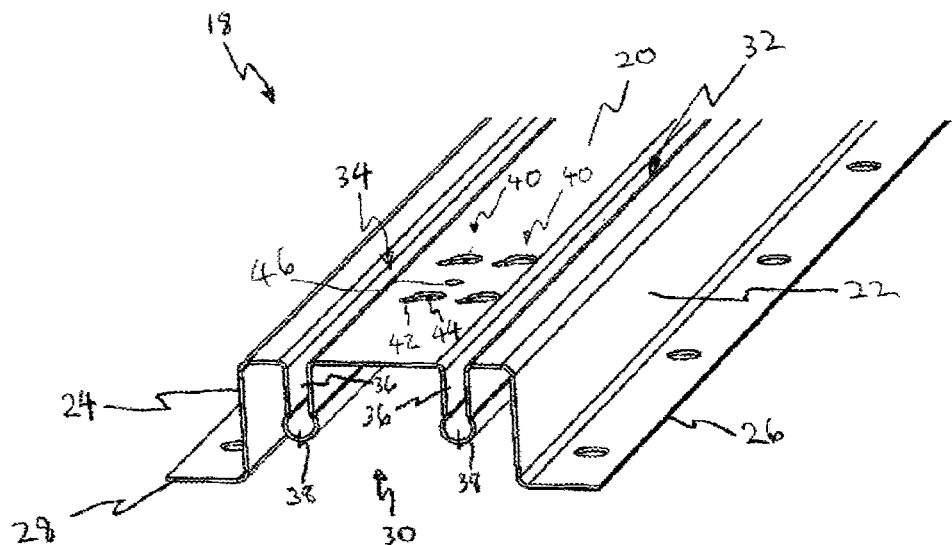
FIG. 3 is a first outer section of the elongate structural element of FIG. 1.

The element 10 farther includes first 18 and second 18' outer sections. As best seen in FIG. 3, the first outer section 18 is formed from a sheet of steel. It will be appreciated, however, that the first outer section 18 may also be formed from a sheet of aluminium, plastic, carbon fibre, or a combination thereof The first outer section 18 is a top hat section that comprises a central wall 20, a pair of side walls 22, 24 and a pair of flanges 26, 28. The side walls 22, 24 respectively extend from the central wall 20 such that a generally U-shaped channel 30 is defined. The flanges 26, 28 respectively extend outwardly from the side walls 22, 24 such that the flanges 26, 28 are aligned to each other and perpendicular to the side walls 22, 24.

The central wall 20 has a pair of longitudinal grooves 32, 34 that depress into the U-shaped channel 30 and are coextensive with each other. The grooves 32, 34 extend the length of the element 10 and are substantially parallel to each other. Each of the grooves 32, 34 comprises a generally keyhole shaped profile with an open narrow region 36 and an enlarged end region 38. The enlarged end regions 38 of the grooves 32, 34 are located about midway into the U-shaped channel 30. The grooves 32, 34 provide the first outer section 18 with additional strength and rigidity such the element 10 is able to better bear structural loads and wind loads. The grooves 32, 34 also provide connection points for other building components (e.g. weather proofing membranes, reflective material and metal panels) that are easily engaged with the keyhole profile of the grooves 32, 34.

Figure 45:
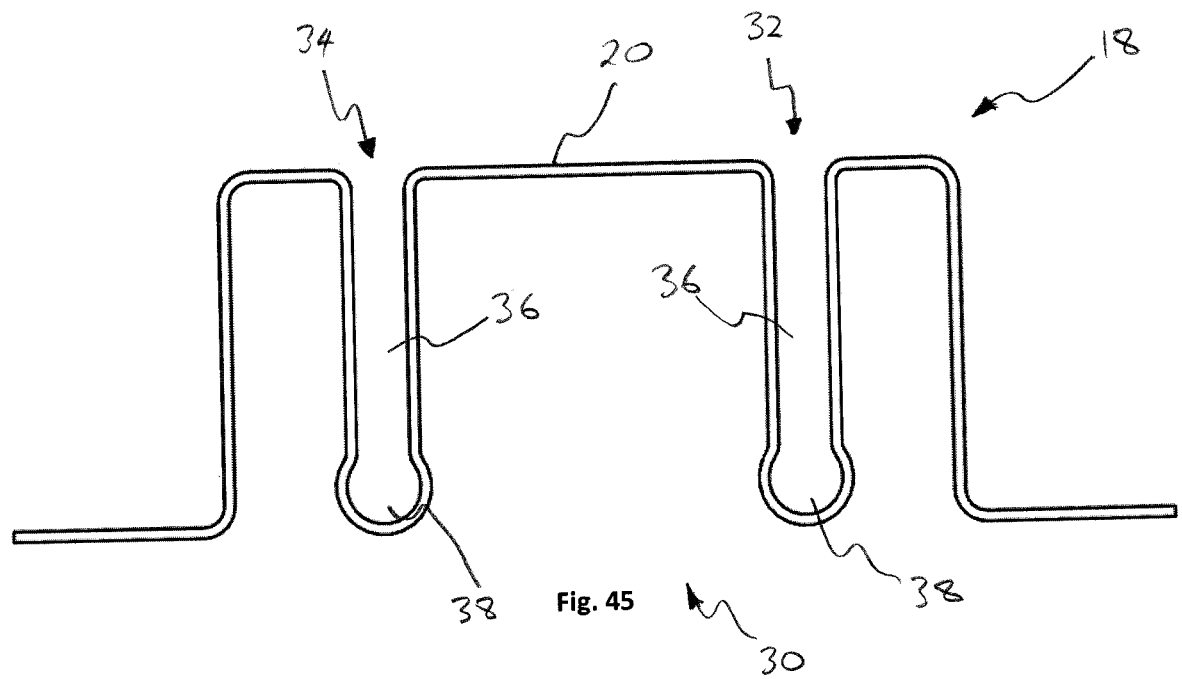
FIG. 45 is an enlarged cross-sectional view of a first outer section of another embodiment of the elongate structure element.
Figure 46:
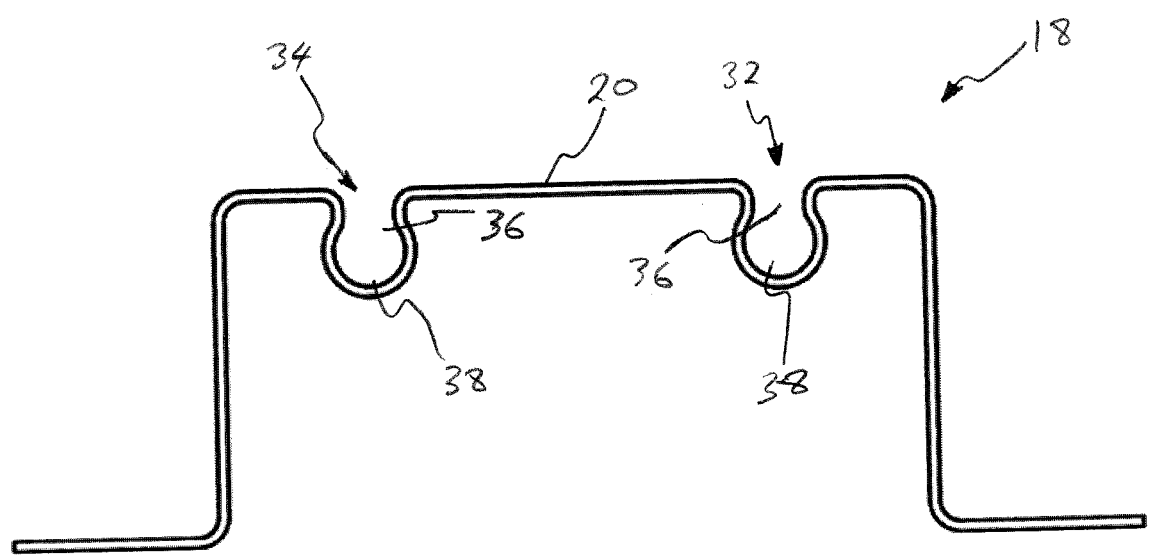
FIG. 46 is an enlarged cross-sectional view of a first outer section of another embodiment of the elongate structure element.

Although, in this embodiment, each of enlarged end regions 38 is substantially circular in shape, it will be appreciated that the enlarged end regions 38 may be of any suitable shape (e.g., triangular, diamond-shaped etc.) in other embodiments. Also, in other embodiments, the degree in which the grooves 32, 34 depress into the channel 30 may vary. For example, as shown in FIG. 45, the grooves 32, 34 may substantially depress into the channel 30 such that the enlarged end regions 38 are located near the opening of the channel 30. Also, as shown in FIG. 46, the grooves 32, 34 may slightly depress into the channel 30 such that the enlarged end regions 38 are located near the central wall 20.

The central wall 20 comprises a plurality of generally keyhole shaped apertures 40, each with a narrowed region 42 and an enlarged region 44. In each keyhole aperture 40, the narrowed region 42 extends from the enlarged region 44 at a 45 degree angle to the longitudinal axis of the element 10. The narrowed regions 42 of the keyhole apertures 40 respectively extend from the enlarged regions 44 in generally the same direction. The keyhole apertures 40 are arranged in groups of 4 and the groups are equally spaced along the length of the element 10. In each group, the keyhole apertures 40 are arranged in a generally rectangular shape with a keyhole aperture 40 in each corner. The central wall 20 farther comprises a plurality of generally circular locating apertures 46 located generally in the centre of each group of keyhole apertures 40.

Figure 4:
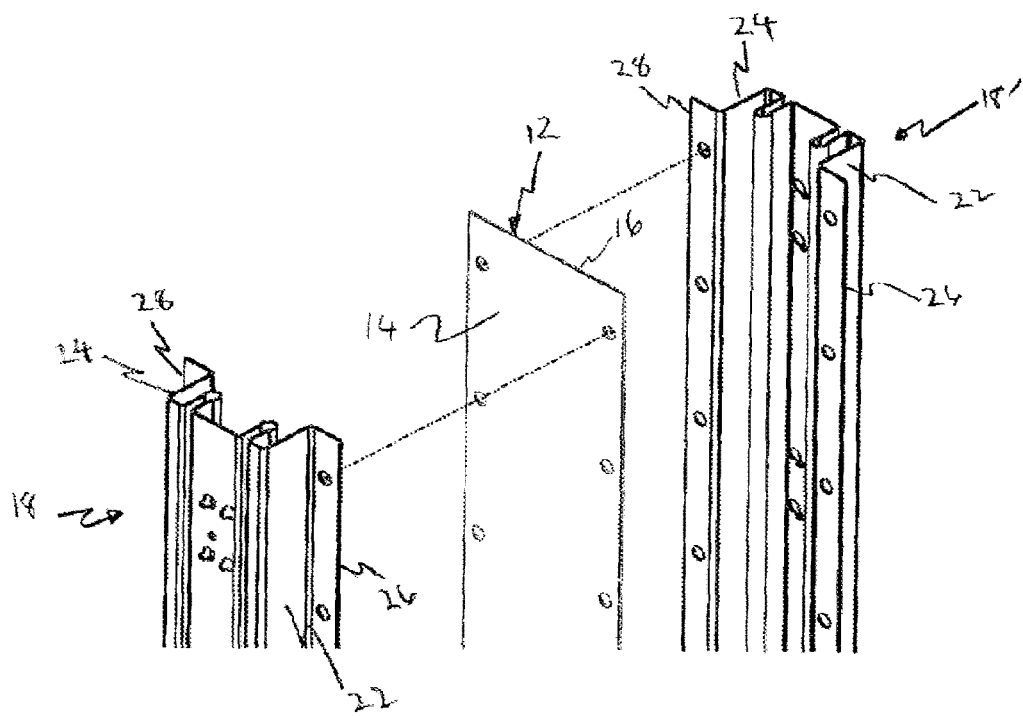
FIG. 4 is an exploded view of the elongate structural element of FIG. 1.

As shown in FIGS. 4.1 and 4.2, in another embodiment of the element denoted 10a, the narrowed regions 42 extend from the enlarged regions 44 substantially parallel with the longitudinal axis of the element 10. It will be appreciated that, in other embodiments, the narrowed regions 42 may extend from the enlarged regions 44 at an angle between 0 to 90 degrees with the longitudinal axis of the element 10.

The second outer section 18' is a mirror image of the first outer section 18 with all the same features. Accordingly, the same reference numerals used for the first outer section 18 will be used herein to denote like features of the second outer section 18'.

As best seen in FIG. 4, the flanges 26, 28 of the first outer section 18 are attached to the first planar surface 14 at edges of the inner plate 12 so that the first outer section 18 is coterminous with the inner plate 12. The flanges 26, 28 of the second outer section 18' are attached to the second planar surface 16 at the edges of the inner plate 12 so that the second outer section 18 is continuous with the inner plate 12. The U-shaped channels 30 of the first and second outer section 18, 18' are substantially closed by the inner plate 12 in a water-tight manner and opposed to each other. The flanges 26, 28 of the first outer section 18 and the flanges 26, 28 of the second outer section 18' are respectively attached to the surfaces 14, 16 of the inner plate 12 by rivets (not shown). It will be appreciated, however, that the flanges 26, 28 of each section 18, 18' may also be respectively attached to the surfaces 14, 16 by metal glue, spot welding, seam welding or a combination thereof In other embodiments, the element 10 may be formed from a unitary sheet of metal which has been folded in such a way to define the inner plate 12 and the outer sections 18, 18'.

Figure 1:
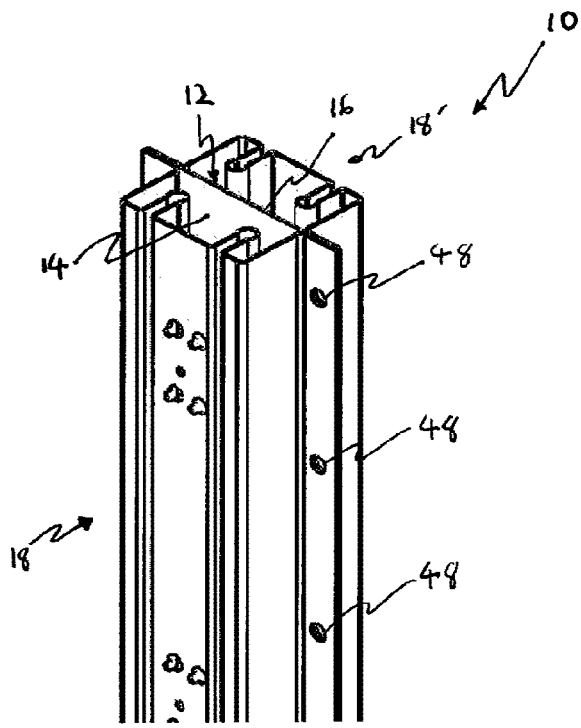
FIG. 1 is a perspective view of an embodiment of an elongate structural element.
Figure 2:
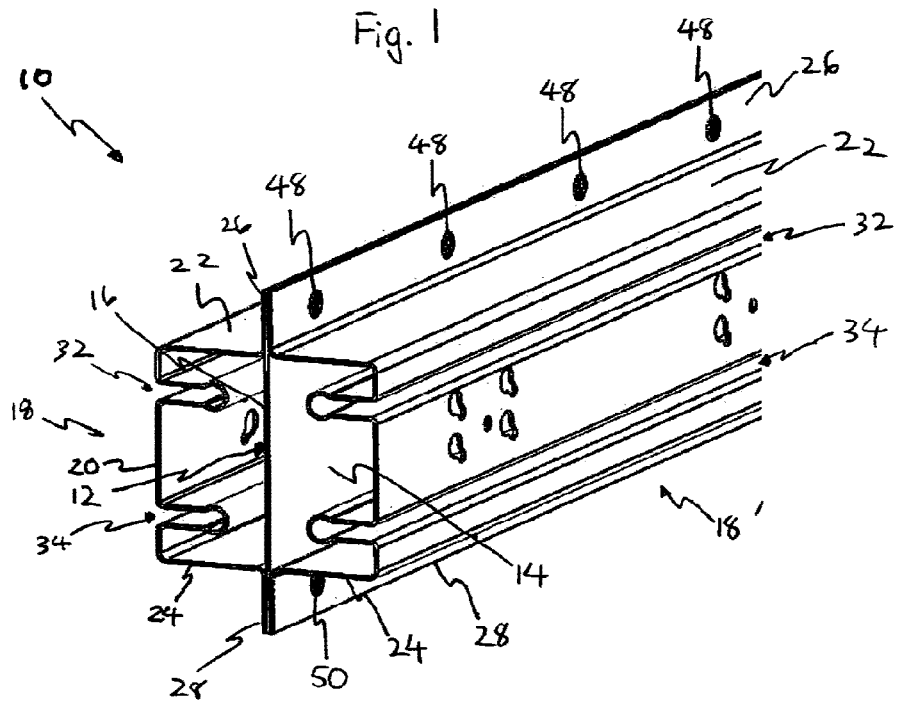
FIG. 2 is another perspective view of the elongate structural element of FIG. 1.

As best seen in FIG. 2, the side walls 22, 24 of the first outer section 18 are respectively aligned with the side walls 22, 24 of the second outer section 18'. The grooves 32, 34 of the first outer section 18 are also respectively aligned with the grooves 32, 34 of the second outer section 18'. The central wall 20 of the first outer section 18 is also parallel with the central wall 20 of the second outer section 18'.

The element 10 farther includes a plurality of first and second circular connection apertures 48, 50. Each of the first connection apertures 48 extend through the flanges 26 of the first and second outer sections 18, 18' and the inner plate 12. The first connection apertures 48 are equally spaced apart along the length of the element 10. Each of the second connection apertures 50 extend through the flanges 28 of the first and second outer sections 18, 18' and the inner plate 12. The second connection apertures 50 are equally spaced apart along the length of the element 10. Each rivet used to fix the flanges 26, 28 of the first and second outer sections 18, 18' to the surfaces 14, 16 of the inner plate 12 are located between a pair of first connection apertures 48 or a pair of second connection apertures 50.

It will be appreciated that a plurality of the elements 10 are connected and assembled together to form the structural frame. It will also be appreciated that each element 10 is prefabricated to the required length and then delivered to the construction site for assembly of the structural frame. It will also be appreciated that the elements 10 can be assembled off-site (e.g., in a factory) and then transported to the construction site.

Figure 8:
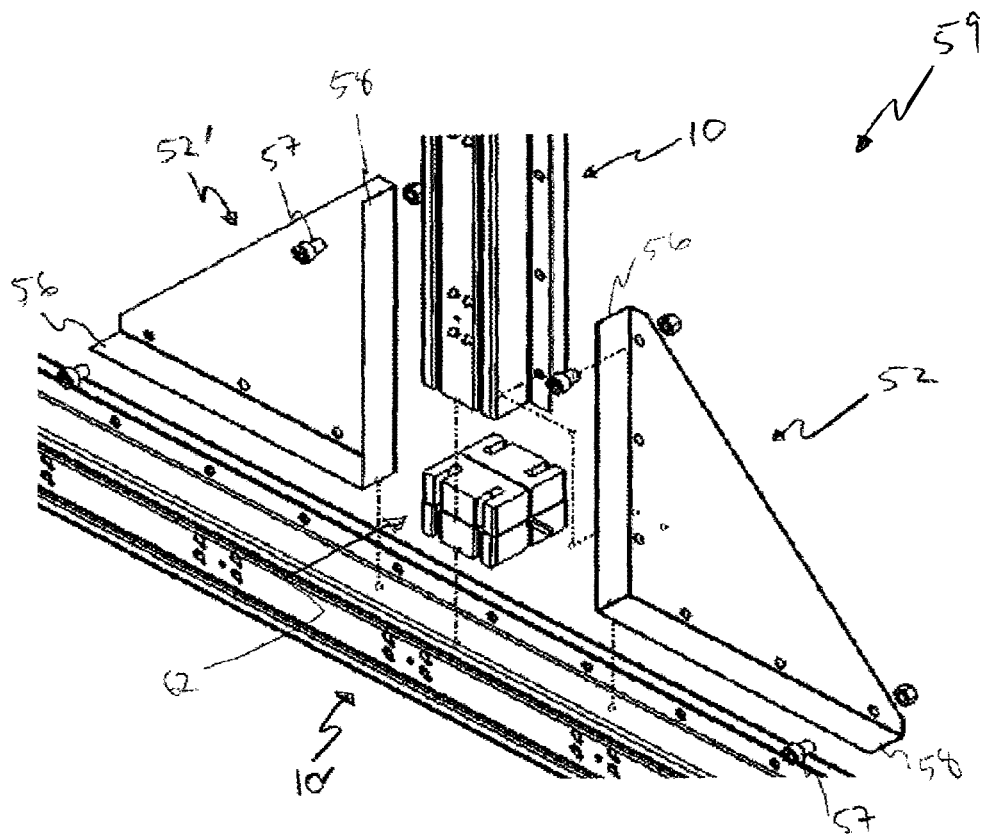
FIG. 8 is an exploded view of a T-connection of the elongate structural element of FIG. 1, the end-to-side interconnection spacer of FIG. 6 and two triangular bracing/support members of FIG. 5.
Figure 9:
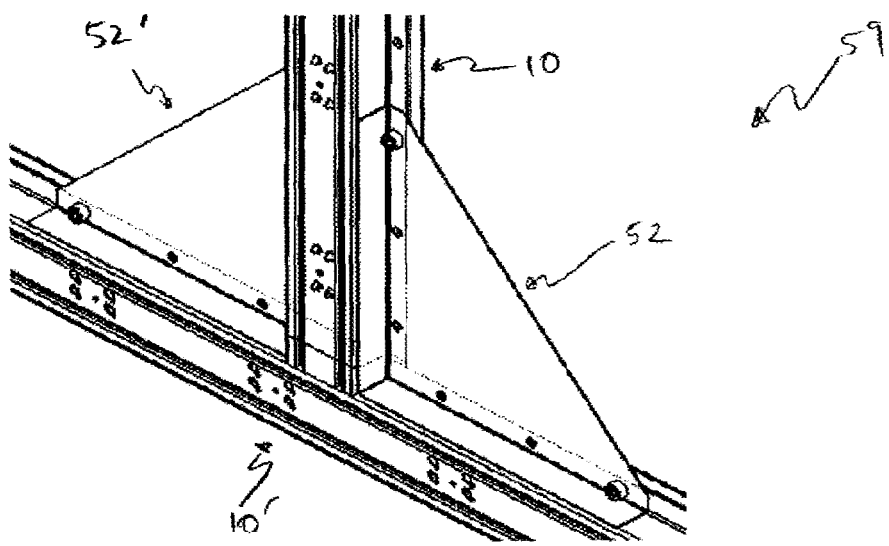
FIG. 9 is a perspective view of the T-connection of FIG. 8.
Figures 16, 17:
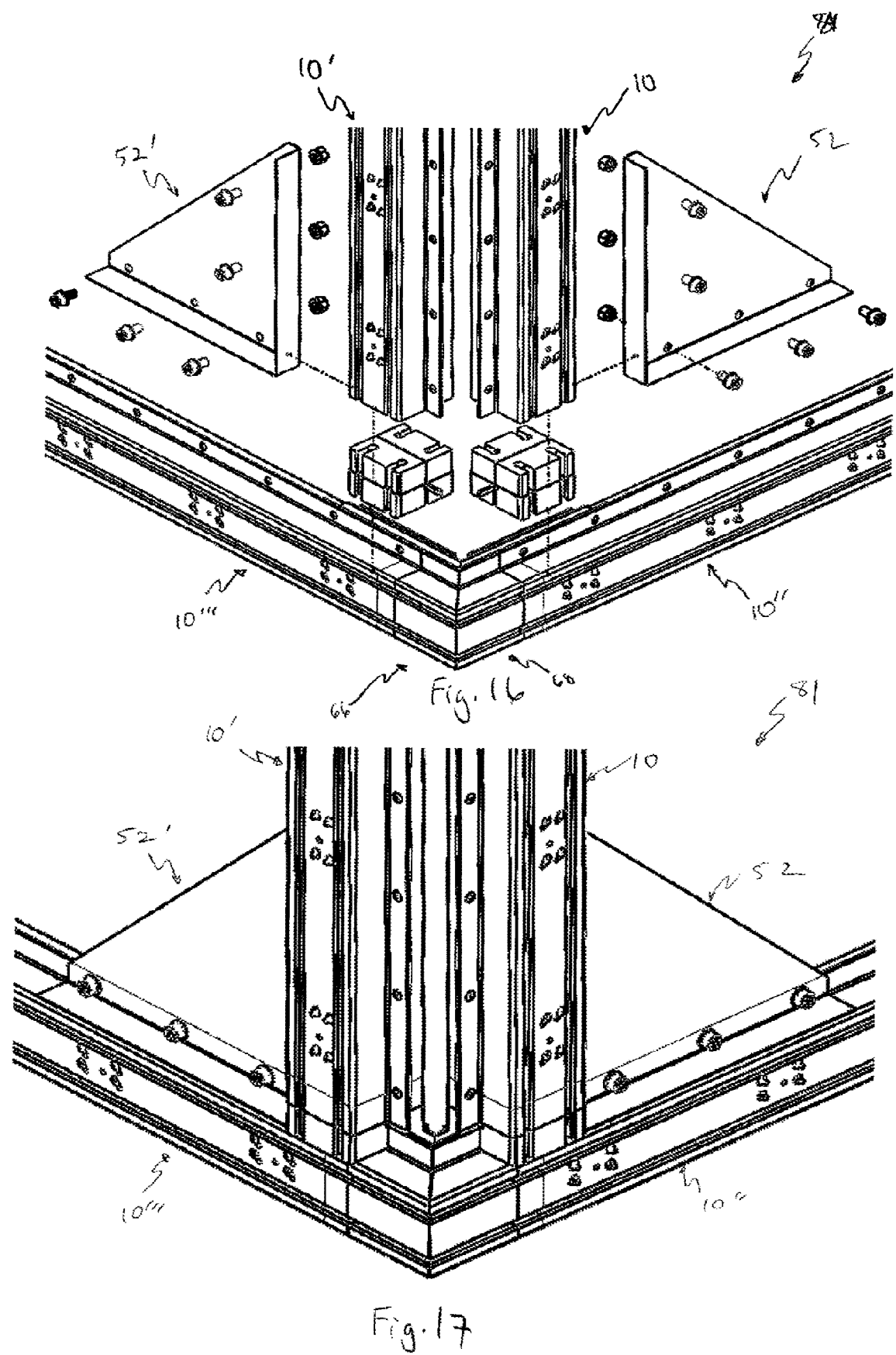
FIG. 16 is an exploded view of a corner T-connection of the corner connection of FIG. 14, two elongate structural elements of FIG. 1, two triangular bracing/support members of FIG. 5, and two end-to-side interconnection spacers of FIG. 6.
FIG. 17 is a perspective view of the corner T-connection of FIG. 16.
Figure 18:
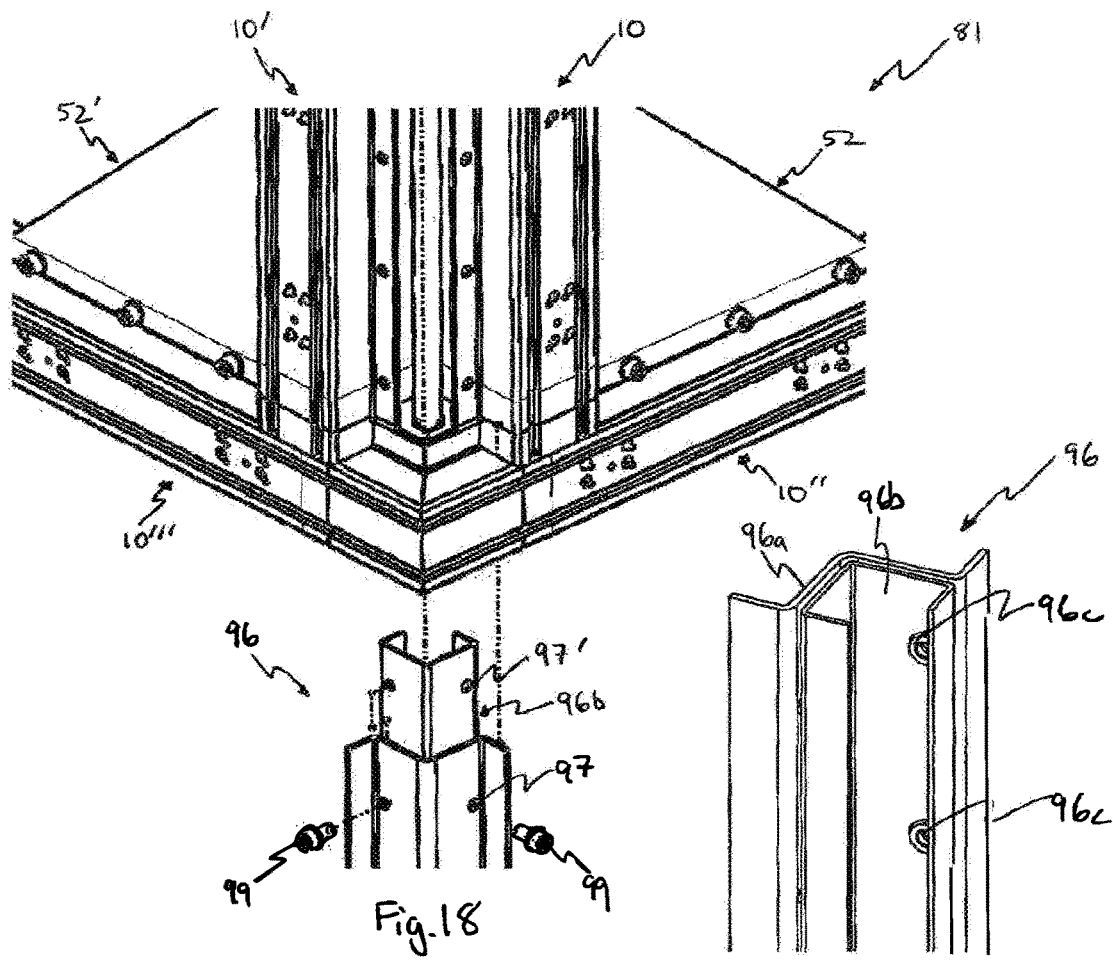
FIG. 18 is an exploded view of the corner T-connection of FIG. 17 and corner stiffening members.
Figure 19:
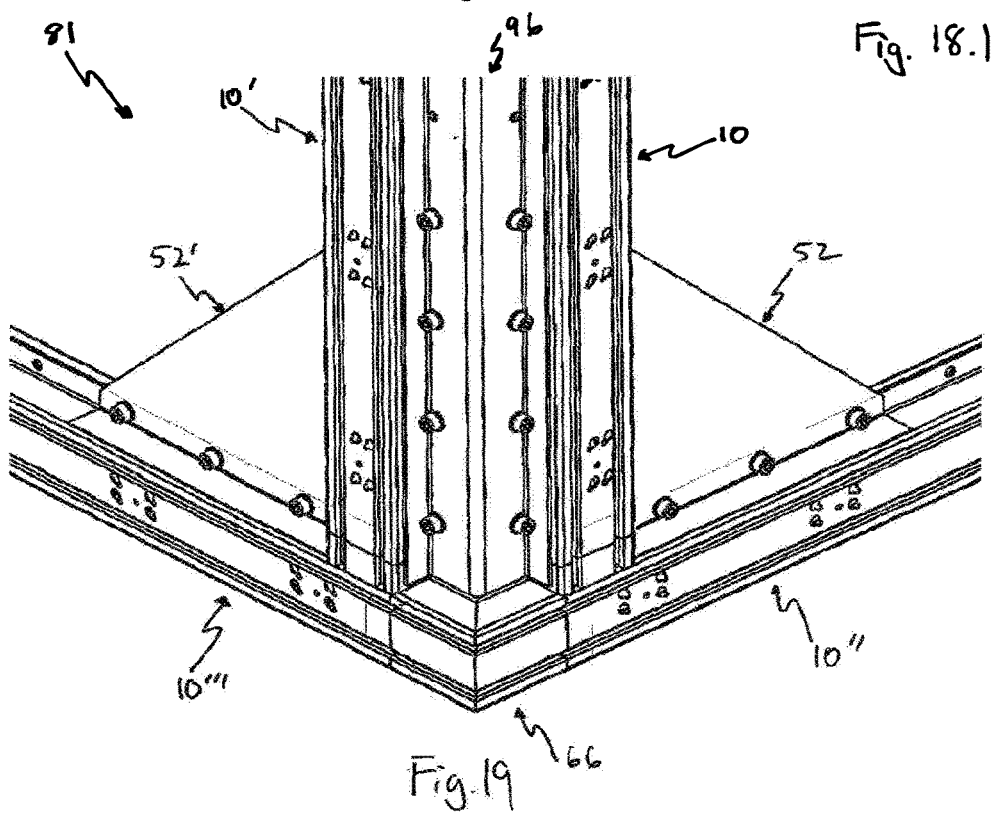
FIG. 19 is a perspective view of the corner T-connection of FIG. 16 and the corner stiffening members of FIG. 18 connected thereto.
Figure 23:
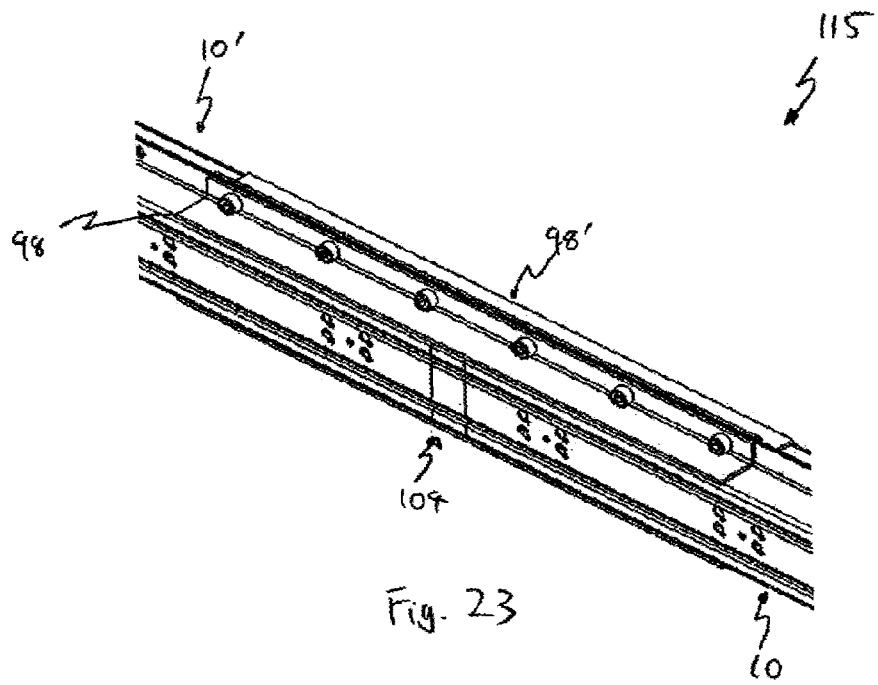
FIG. 23 is a perspective view of the straight connection of FIG. 22.

Although the elements 10 can be connected together in numerous different ways, only the following exemplary connections will be described below:
a T-connection (as seen in FIGS. 8 and 9);
a comer connection (as seen in FIGS. 11, 12, 14 and 15);
a corner T-connection (as seen in FIGS. 16 to 19); and
a straight connection (as seen in FIGS. 22 and 23).

The supporting and/or connecting components utilised for the above connections will also be described below.

FIGS. 5 and 5.1 show a triangular bracing/support member 52 formed from a sheet of steel. The bracing/support member 52 has a main plate 54 and a pair of flanges 56, 58 respectively extending from a pair of adjacent edges of the main plate 54. The flanges 56, 58 are perpendicular to each other and each flange 56, 58 is perpendicular to the main plate 54. The main plate 54 has a plurality of apertures 60 located substantially adjacent and equally spaced along the adjacent edges. The main plate 54 also has a plurality of clearance apertures 60a. Each clearance aperture 60a is located between a pair of apertures 60. The main plate 54 also has a stiffening groove 61 that extends parallel to a free edge 61a of the main plate 54. As best seen in FIG. 5.1, the bracing/support member 52 also has a plurality of bolt nuts 61b attached to the main plate 54 such that each bolt nut 61b corresponds to an aperture 60.

FIGS. 6 and 7 show an end-to-side interconnection spacer 62 for connecting two elements 10 in a T-shape. The end-to-side interconnection spacer 62 is generally cubic in shape and has a first portion 63 and a second portion 64. The first portion 63 has a profile substantially matching the inner profile of the element 10 with a transverse slot 65 such that the first portion 63 is able to be fittingly received into an end of the element 10 with an edge of the inner plate 12 received into the transverse slot 65. The second portion 64 has a profile substantially matching the outer profile of the element 10 such that the second portion 64 is flush with the outer profile of the element 10 when the first portion 63 is received therein. The second portion 64 also has a transverse slot 65' for receiving the flanges 26 and an edge of the inner plate 12 of another element 10. The end-to-side interconnection spacer 62 also has a pair of flanges 69, 69' that extend outwardly from respective sides of the second portion 64.

In another embodiment, as shown in FIG. 7.1, the first and second portions 63, 64 of the end-to-side interconnection spacer 62 can be substantially hollowed to reduce the amount of material required for its manufacture. Also, the transverse slot 65' of the second portion 64 can be substantially enlarged.

FIGS. 8 and 9 show a T-connection 59 in which two elements 10, 10' are connected by the end-to-side interconnection spacer 62 and supported by two bracing/support members 52, 52'. In forming the T-connection, the second portion 64 of the end-to-side interconnection spacer 62 is engaged with the element 10' such that the flanges 26 and the inner plate 12 of the element 10' are received into the transverse slot 65' and the second portion 64 abuts with the sidewalls 22 of the element 10'. This will also abut the flanges 69, 69' against the inner plate 16 and the flanges 26 of the element 10'. The element 10 is then engaged with the first portion 63 of the end-to-side interconnection spacer 62 such that the first portion 63 is received into the end of the element 10 and the inner plate 12 of the element 10 is received into the transverse slot 65. This will arrange the element 10 perpendicularly to the element 10'. Two bracing/support member 52, 52' are then joined to the element 10 and the element 10'. Specifically, the main plate 54 of the bracing/support member 52 is abutted against the flange 26 of the first outer section 18 of the element 10 and the flange 26 of first outer section 18 of the element 10'. It will be appreciated that the clearance apertures 60a of the main plate 54 will accommodate the rivets of the elements 10, 10' such that the main plate 54 can be abutted against the flanges 26 of the elements 10, 10'. The flange 56 of the bracing/support member 52 is abutted against the side wall 22 of the first outer section 18 of the element 10 and the flange 58 of the bracing/support member 52 is abutted against the side wall 22 of the first outer section 18 of the element 10'. This will respectively align the apertures 60 of the bracing/support member 52 with some of the apertures 48 of the element 10 and some of the apertures 48 of the element 10'. Also, the main plate 54 of the bracing/support member 52' is abutted against the flange 28 of the first outer section 18 of the element 10 and the flange 26 of the first outer section 18 of the element 10'. The flange 58 of the bracing/support member 52' is abutted against the side wall 24 of the first outer section 18 of the element 10 and the flange 56 of the bracing/support member 52' is abutted against the side wall 22 of the first outer section 18 of the element 10'. This will respectively align the apertures 60 of the bracing/support member 52' with some of the apertures 50 of the element 10 and some of the apertures 48 of the element 10'. A plurality of bolts 57 are then passed through the aligned apertures and screwably secured to the bolt nuts 61b of the Bracing/Support Member 52, 52'. An Advantage of the end-to-side interconnection spacer 62 is that it enables the transfer of load and allows for expansion. Also, the end-to-side interconnection spacer 62 enables the continuation of waterproofing membranes to be connected to the elements 10, 10'.

FIG. 10 shows a corner interconnection spacer 66 for connecting two elements 10 at a corner. The spacer 66 has a central portion 68 and a pair of end portions 70, 72. The end portion 70 has a profile substantially matching the inner profile of the element 10 with a transverse slot 74 such that the end portion 70 is able to be fittingly received into an end of the element 10 with an edge of the inner plate 12 of that element 10 received into the transverse slot 74. The end portion 72 has the same profile with a transverse slot 76 such that the end portion 72 is able to be fittingly received into an end of another element 10 with an edge of the inner plate of that element 10 received into the transverse slot 76. The central portion 68 has a profile substantially matching the outer profiles of the elements 10 such that the central portion 68 is flush with the outer profiles of the elements 10 when the end portions 70, 72 are received therein. The central portion 68 is perpendicularly bent such that the elements 10 are substantially perpendicular to each other when the end portions 70, 72 are received therein. The corner interconnection spacer 66 also has a pair of right-angled flanges 73 that extend outwardly from respective sides of the central portion 68.

FIGS. 11 and 12 show a corner connection 73 in which two elements 10, 10' are connected by the corner interconnection spacer 66 and are perpendicularly oriented. In forming the corner connection, the corner interconnection spacer 66 is engaged with the elements 10, 10' such that the end portion 70 is received into an end of the element 10 and the end portion 72 is received into an end of the element 10'. Given that the central portion 68 of the spacer 66 has the same outer profile as the elements 10, 10', each groove 32, 34 of the first and second sections 18, 18' of the element 10 is continuously connected to a respective groove 32, 34 of the first and second section 18, 18' of the element 10'. Also, the right-angled flanges 73 are aligned with the inner plates 16 and the flanges 26, 28 of the elements 10, 10'.

FIG. 13 shows a corner bracket 78 comprising two top hat sections 80, 80' joined together at a right-angle. The section 80 comprises a central wall 84, a pair of side walls 86, 88 and a pair of flanges 90, 92. The side walls 86, 88 respectively extend from the central wall 84 such that a generally U-shaped channel 94 is defined. The flanges 90, 92 respectively extend outwardly from the side walls 86, 88 such that the flanges 90, 92 are aligned to each other and perpendicular to the side walls 86, 88. Each of the flanges 90, 92 has a plurality of apertures 93 equally spaced apart. The section 80' is substantially identical to the section 80 with all the same features. Accordingly, the same reference numerals used for the section 80 will be used herein to denote like features of the section 80'. The corner bracket 78 farther comprises a floor support having a triangular plate 98 and two rectangular plates 100, 102. The rectangular plates 100, 102 respectively extend from adjacent edges of the triangular plate 98 such that the rectangular plates 100, 102 are perpendicular to the triangular plate 98 and each other. The rectangular pate 102 is attached to the central wall 84 of the section 80 and the rectangular plate 100 is attached to the central wall 84 of the section 80'.

FIGS. 14 and 15 show the corner connection 73 secured by the corner bracket 78. In securing the corner connection 73, the U-shaped channel 94 of the section 80 receives the central wall 20 and the side walls 22, 24 of the second outer section 18' of the element 10 and the flanges 90, 92 respectively abuts with the flanges 26, 28 of the second outer section 18' of the element 10. Also, the U-shaped channel 94 of the section 80' receives the central wall 20 and the side walls 22, 24 of the second outer section 18' of the element 10' and the flanges 90, 92 respectively abuts with the flanges 26, 28 of the second outer section 18' of the element 10'. This will respectively align the apertures 93 of the corner bracket 78 with some of the apertures 48, 50 of the elements 10, 10'. A plurality of bolts 79 are then passed through the aligned apertures and screwably secured.

FIGS. 16 to 19 show a corner T-connection 81 in which two elements 10, 10' are respectively connected to a corner connection of two elements 10", 10"'. It will be appreciated that the corner connection will be formed in the same manner as described above. In forming the T-connections, the element 10 is connected to the element 10" adjacent the central portion 68 of the corner interconnection spacer 66 by a T-connection as described above. However, the bracing/support member 52' is not utilised in this T-connection and the end-to-side interconnection spacer 62 shown in FIG. 7.1 is utilised such that the enlarged transverse slot 65' can accommodate the flange 90 of the corner bracket 78. Similarly, the element 10' is connected to the element 10" adjacent the central portion 68 of the corner interconnection spacer 66 by a T-connection as described above. However, the bracing/support member 52 is not utilised in this T-connection and the end-to-side interconnection spacer 62 shown in FIG. 7.1 is utilised such that the enlarged transverse slot 65' can accommodate the flange 90 of the corner bracket 78. As specifically shown in FIGS. 18, 18.1 and 19, for securement, corner stiffening members 96 formed from a W-shaped bracket 96a and C-shaped bracket 96b. The W-shaped bracket 96a is abutted against the flanges 28 of the first outer section 18 of the element 10 and the flanges 26 of the first outer section 18 of the element 10'. The W-shaped bracket 96a has apertures 97 along its length for alignment with some of the apeliures 50 of the element 10 and some of the apertures 48 of the element 10'. The C-shaped bracket 96b is abutted against the flanges 28 of the second outer section 18' of the element 10 and the flanges 26 of the second outer section 18' of the element 10'. The C-shaped bracket 96b has apertures 97' along its length for alignment with some of the apertures 50 of the element 10 and some of the apertures 48 of the element 10'. The corner stiffening members 96 further has a plurality of bolt nuts 96c attached to the C-shaped bracket 96b such that each bolt nut 96c corresponds to an aperture 97'. This allows bolts 99 to be passed through the aligned apertures and screwably secured to the bolt nuts 96c.

FIG. 20 shows a stiffening rail 98 formed from a L-shaped steel section. The rail 98 has a first wall 98a and a second wall 98b perpendicular to the first wall 98a. The first wall 98a includes a plurality of apertures 101 equally spaced along its length.

FIG. 21 shows an end-to-end interconnection spacer 104 for connecting two elements 10. The end-to-end interconnection spacer 104 has a central portion 106 and a pair of end portion 108, 110. The end portion 108 has a profile substantially matching the inner profile of the element 10 with a transverse slot 112 such that the end portion 108 is able to be fittingly received into an end of the element 10 with an edge of the inner plate 12 of that element 10 received into the transverse slot 112. The end portion 110 has the same profile with a transverse slot 114 such that the end portion 110 is able to be fittingly received into an end of another element 10 with an edge of the inner plate 12 of that element 10 received into the transverse slot 114. The central portion 106 has a profile substantially matching the outer profiles of the elements 10 such that the central portion 106 is flush with the outer profiles of the elements 10 when the end portions 108, 110 are received therein. The central portion 106 is shaped such that the elements 10 are substantially linearly aligned to each other when the end portions 108, 110 of the end-to-end interconnection spacer 104 are received therein. The spacer 104 also has a pair of flanges 105 that extend outwardly from respective sides of the central portion 68.

FIGS. 22 and 23 show a straight connection 115 in which two elements 10, 10' are connected by the end-to-end interconnection spacer 104 and secured by four rails 98, 98', 98", 98"'. In forming the straight connection, the end-to-end interconnection spacer 104 is engaged with the element 10, 10' such that the end portion 108 of the spacer 104 is received into an end of the element 10 and the end portion 110 of the spacer 104 is received into an end of the element 10'. The rail 98, 98', 98", 98"' are then engaged with elements 10, 10' and the spacer 104 such that the apertures 101 of the rails 98, 98', 98", 98"' are respectively aligned with some of the apertures 48, 50 of the elements 10, 10' such that bolts 107 can pass through the aligned apertures and be screwably secured. Given that the central portion 106 of the spacer 104 has the same outer profile as the elements 10, 10', each groove 32, 34 of the first and second sections 18, 18' of the element 10 is continuously connected to a respective groove 32, 34 of the first and second sections 18, 18' of the element 10'.

An advantage of the element 10 is that it is easily and quickly connected with other elements 10 without the need for highly skilled technicians. As the element 10 is essentially formed from three pieces of sheet metal, it can be mass manufactured in an easy, quick and cost effective manner. This allows the element 10 to be readily prefabricated to the required length and delivered to a construction site for assembly.

Another advantage of the element 10 is that all connections with other elements 10' are not permanent and easily disassembled. Specifically, all connections are secured only by removable bolts that pass through prefabricated apertures (e.g. apertures 48, 50).

Another advantage of the element 10 is that, once assembled with other elements 10, additional elements 10 can be easily connected.

Another advantage of the element 10 is that the grooves 32, 34 of the first and second outer sections 18, 18' of the element 10 provide additional strength and rigidity such that the element 10 can bear more structural loads. Further, the grooves 32, 34 provide connections points for other building materials, such as weather proofing membranes, reflective material and metal panels.

Another advantage of the element 10 is that water cannot pass between the U-shaped channel 30 of the first outer section 18 and the U-shaped channel 30 of the second outer section 18'. This is particularly useful, when one of the sections 18, 18' is exposed to the outside environment and the other section 18, 18' is indoors.

Figure 24:
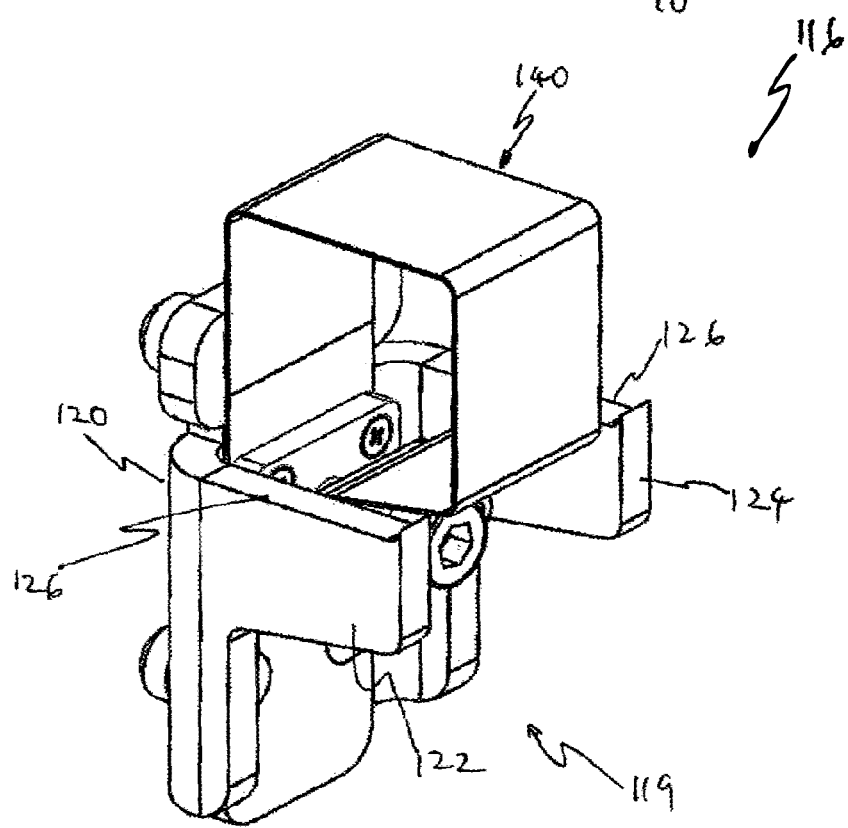
FIG. 24 is a perspective view of an embodiment of a bracket in a closed configuration.
Figure 25:
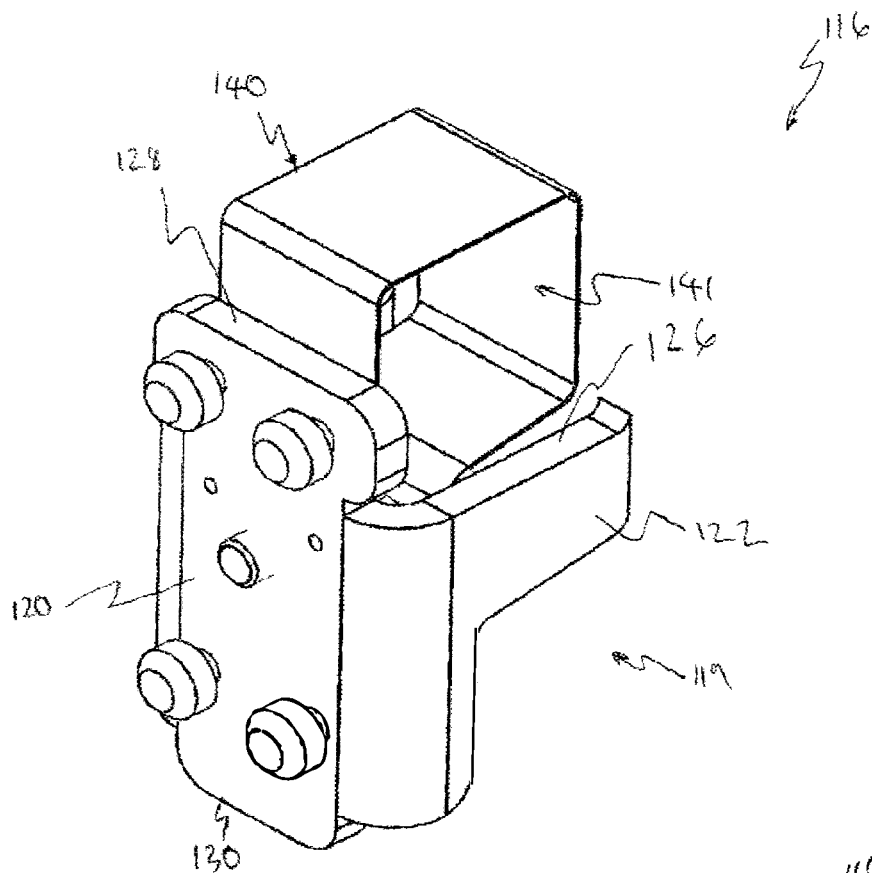
FIG. 25 is another perspective view of the bracket of FIG. 24.
Figure 26:
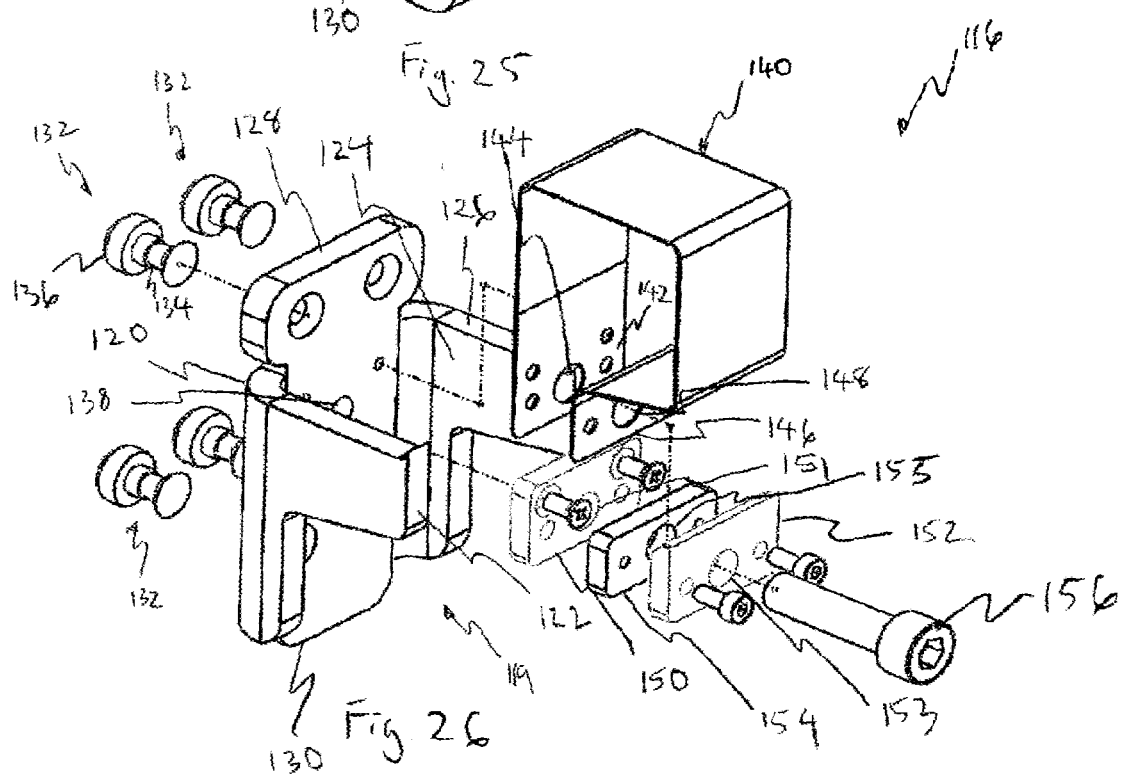
FIG. 26 is an exploded view of the bracket of FIG. 24.

FIGS. 24 to 26 show an embodiment of a bracket 116 for connecting a square tube rail 118 to the element 10 such that the rail 118 is perpendicular to the element 10. The bracket 116 includes a body 119 configured for attachment to the element 10. The body 119 is formed from a unitary piece of steel and comprises a plate 120 and two arm members 122, 124. The arm members 122, 124 respectively extend outwardly from the plate 120 such that a generally U-shaped profile is defined. Each arm member 122, 124 has a surface 126 that is perpendicular to the plate 120 and located between ends portions 128, 130 of the plate 120. The surfaces 126 of the arm members 122, 124 define a shoulder for supporting the rail 118.

The body 119 further comprises four button stud slot pins 132 extending outwardly from the plate 120 in an opposite direction to the arm members 122, 124. The slot pins 132 are arranged in a generally rectangular shape with a slot pin 132 in each corner. Each slot pin 132 has a narrow portion 134 and an enlarged end portion 136. The plate 120 comprises a circular threaded aperture 138 located generally in the centre below the surfaces 126 of the arm members 122, 124.

The bracket 116 farther includes a strap 140 configured for wrapping around the rail 118. The strap 140 is formed from a minimum 20 mm wide steel ribbon that has thickness between 0.125 to 0.33 mm so as to be substantially flexible. As best seen in FIG. 26, the strap 140 is plastically bent in four areas to define, in a closed configuration, a generally square shaped aperture 141 for the rail 118. The aperture 141 has a profile substantially corresponding with an outer profile of the rail 118. It will also be appreciated that the strap 140 is biased to the closed configuration. The strap 140 has a first end 142 with a circular aperture 144 and a second end 146 with a circular aperture 148. In the closed configuration, the circular aperture 144 and the circular aperture 148 are substantially aligned and the first end 142 is spaced from the second end 146. The first end 142 is secured to the body 119 between the arm members 122, 124 and below the surfaces 126 by a pressure plate 150 such that the first end 142 is sandwiched between the pressure plate 150 and the plate 120 and the aperture 144 is substantially aligned with the aperture 138. The pressure plate 150 has a circular aperture 151 substantially aligned with the aperture 144. The bracket 116 farther includes a pair of pressure plates 152, 154 that are attached to the second end 146 so that the second end 146 is sandwiched therebetween. Each of the pressure plates 152, 154 has a circular aperture 153, 155 that is substantially aligned with the aperture 148 of the second end 146.

The bracket 116 farther includes a threaded bolt 156 configured for attaching the second end 146 to the plate 120. The bolt 156 is also configured for fixing the location of the plate 120 relative to the element 10. The bolt 156 is sequentially passed through the apertures 153, 148, 155 with its head located to face outwardly.

It will be appreciated that, in other embodiments, the body 119 and strap 140 may be formed from any other suitable material such as plastic or aluminium. It will be appreciated that the strap 140 may have a thickness between 0.05 to 0.5 mm.

The operation of securing the rail 118 to the element 10 by the bracket 116 will now be described.

Figure 27:
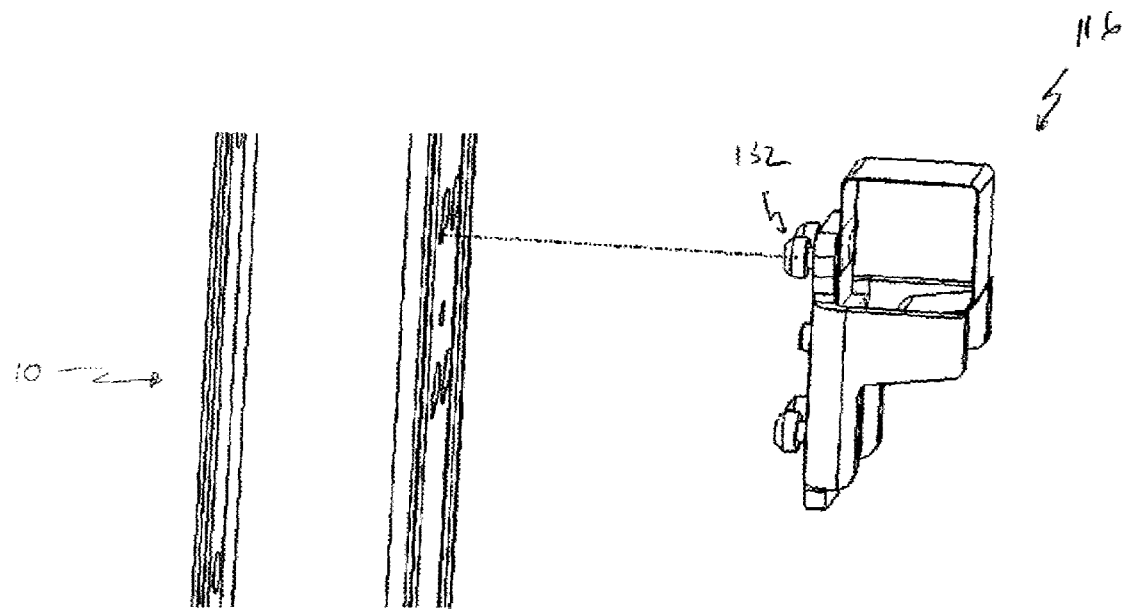
FIG. 27 is an exploded view of a bracket connection of the bracket of FIG. 24 and the elongate structural element of FIG. 1.
Figure 28:
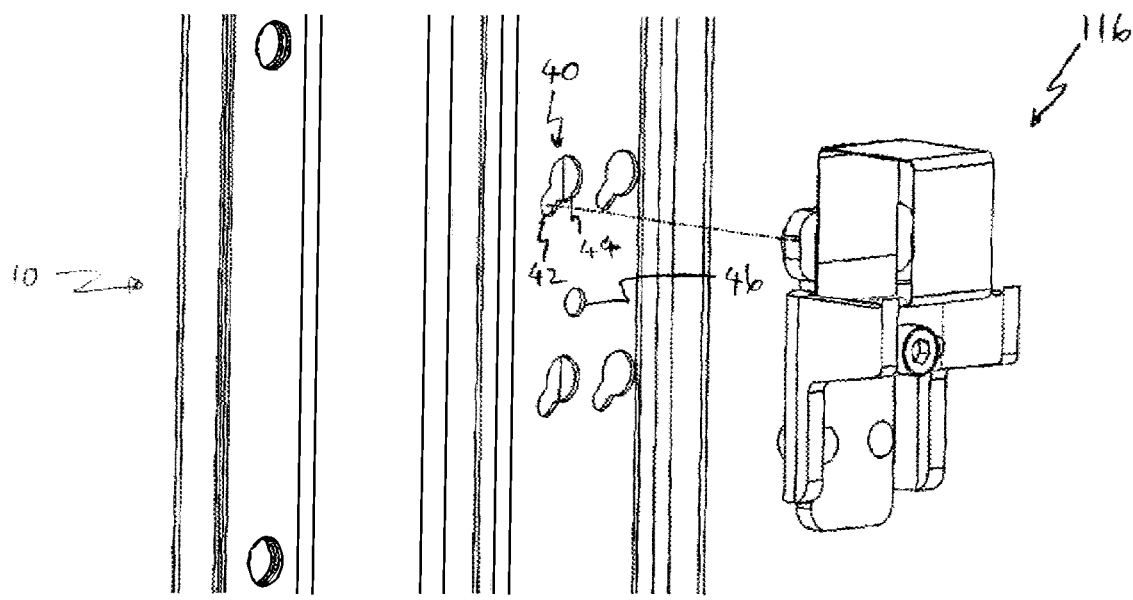
FIG. 28 is another exploded view of the bracket connection of FIG. 27.
Figure 29:
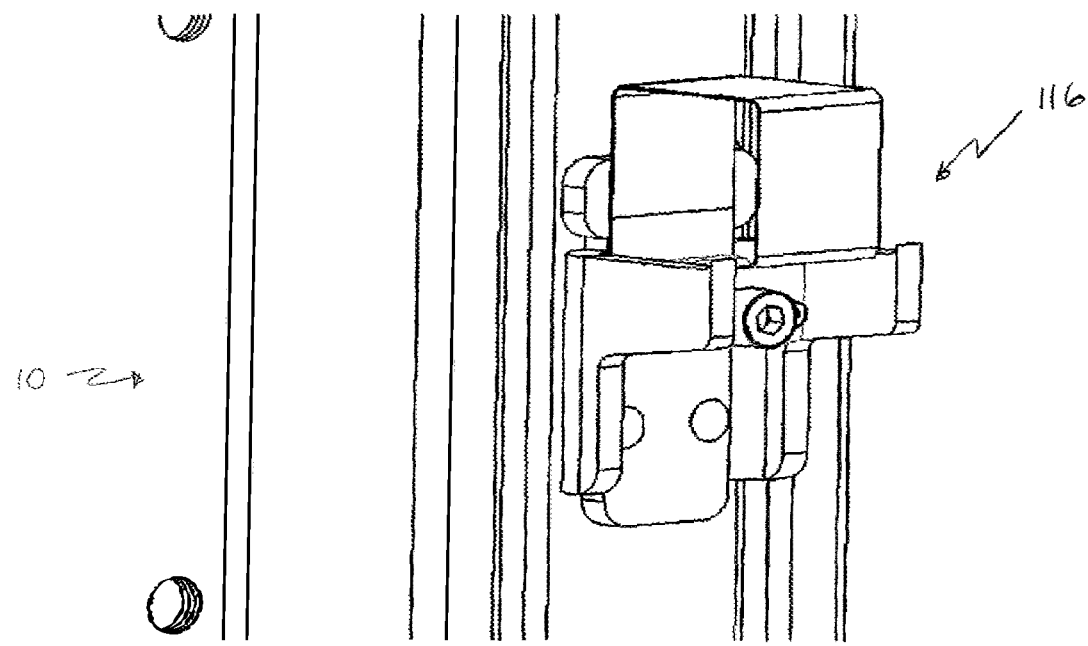
FIG. 29 is a perspective view of the bracket connection of FIG. 27.

As shown in FIGS. 27 to 29, the slot pins 132 of the bracket 116 are inserted and locked into a group of keyhole apertures 40 of the first outer section 18 of the element 10. Specifically, the enlarged end portion 136 of each slot pin 132 is inserted into the enlarged region 44 of a respective keyhole aperture 40. The bracket 116 is then moved so that the narrowed portions 134 of the slot pins 132 are received into the narrowed regions 42 of the keyhole apertures 40. This will lock the bracket 116 such that lateral movement in relation to the element 10 is prevented. Also, this will substantially align the apertures 138, 144, 148, 151, 153, 155 with a locating aperture 46 of the element 10.

Figure 30:
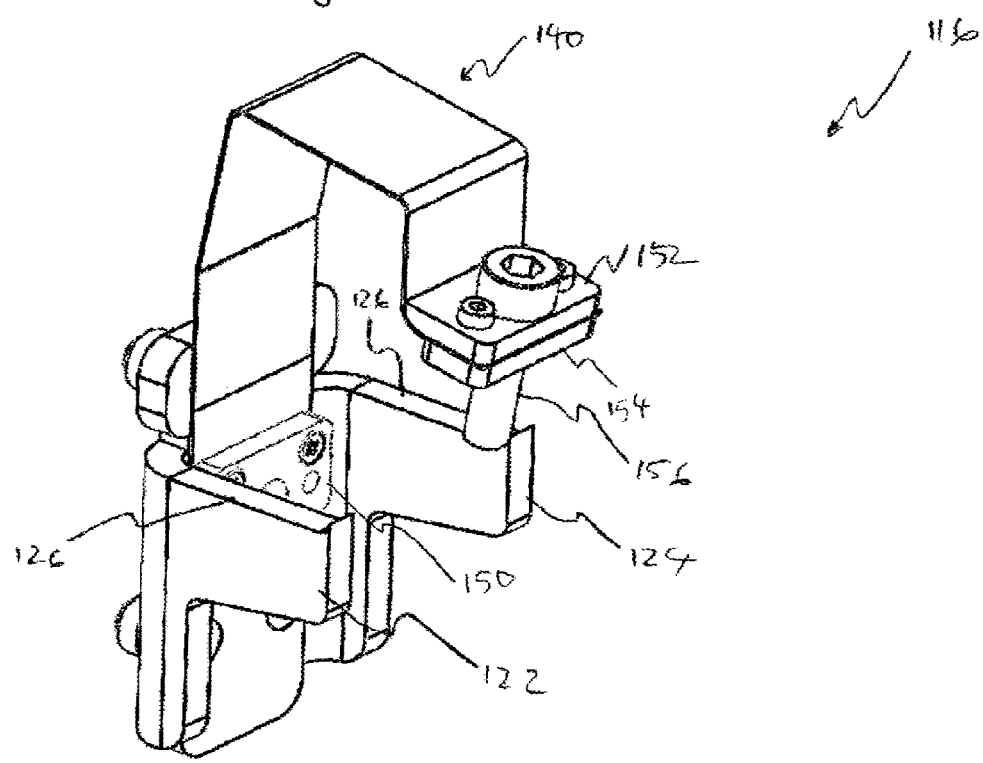
FIG. 30 is a perspective view of the bracket of FIG. 24 in a partially open configuration.
Figure 31:
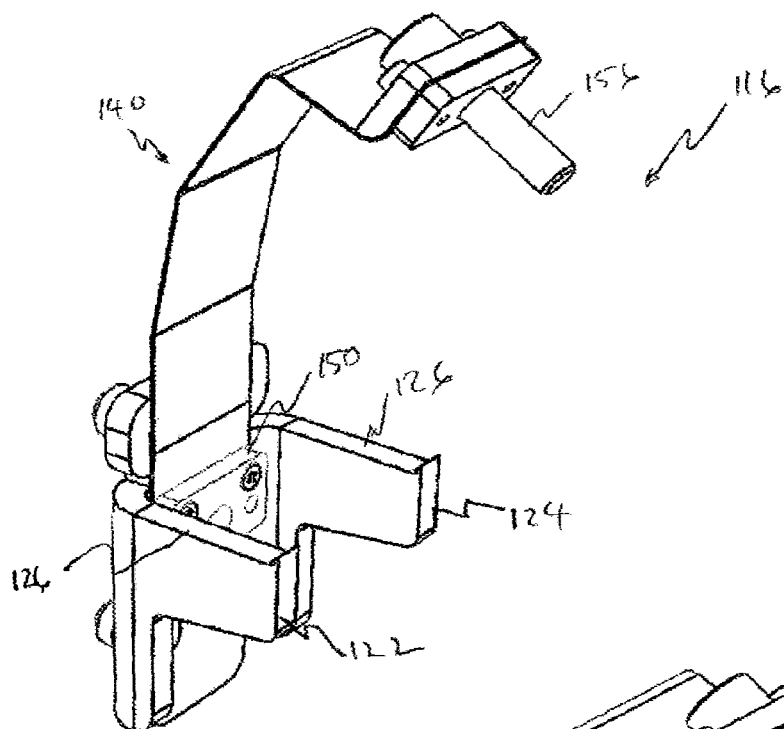
FIG. 31 is a perspective view of the bracket of FIG. 24 in a fully open configuration.
Figure 32:
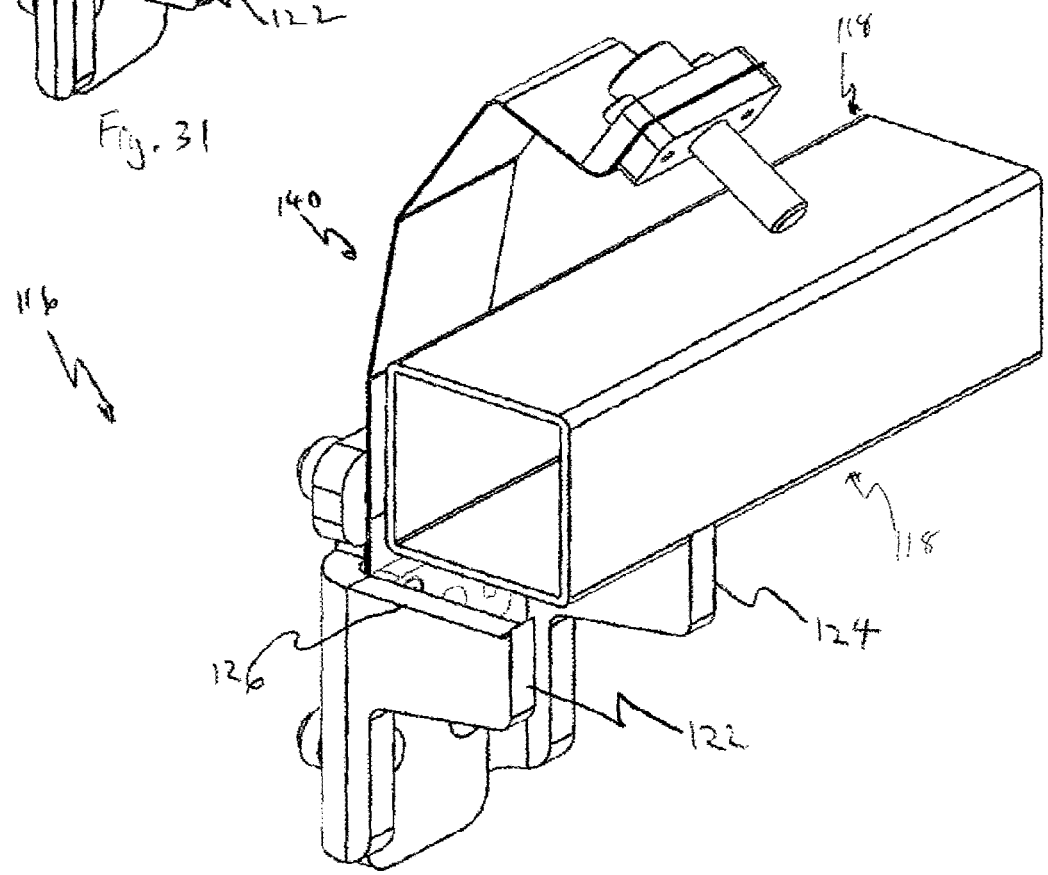
FIG. 32 is a perspective view of the bracket of FIG. 24 in the fully open configuration and receiving a rail.
Figure 33:
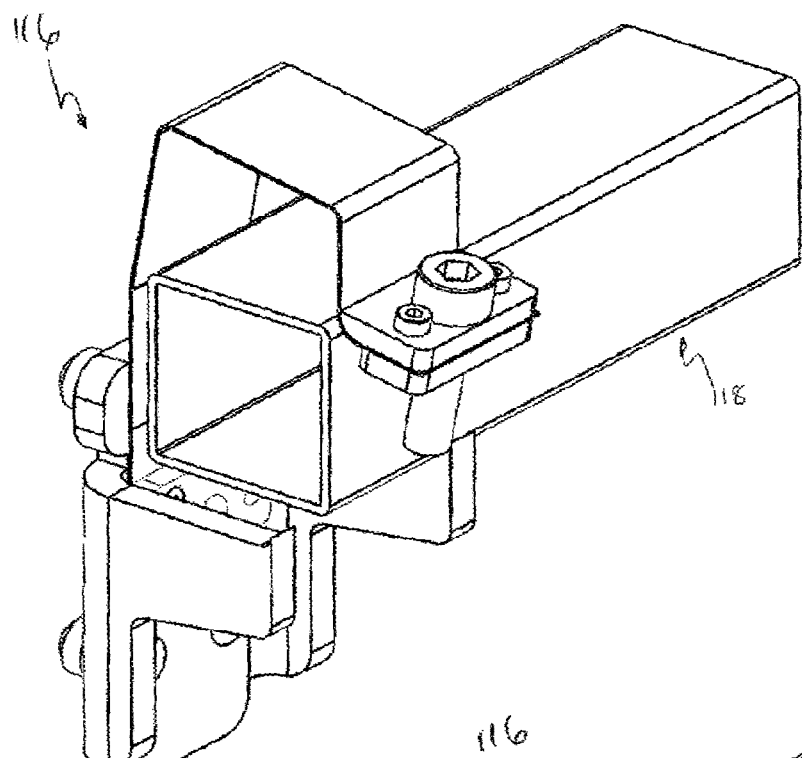
FIG. 33 is a perspective view of the bracket of FIG. 24 in the partially open configuration and receiving the rail of FIG. 32.
Figure 34:
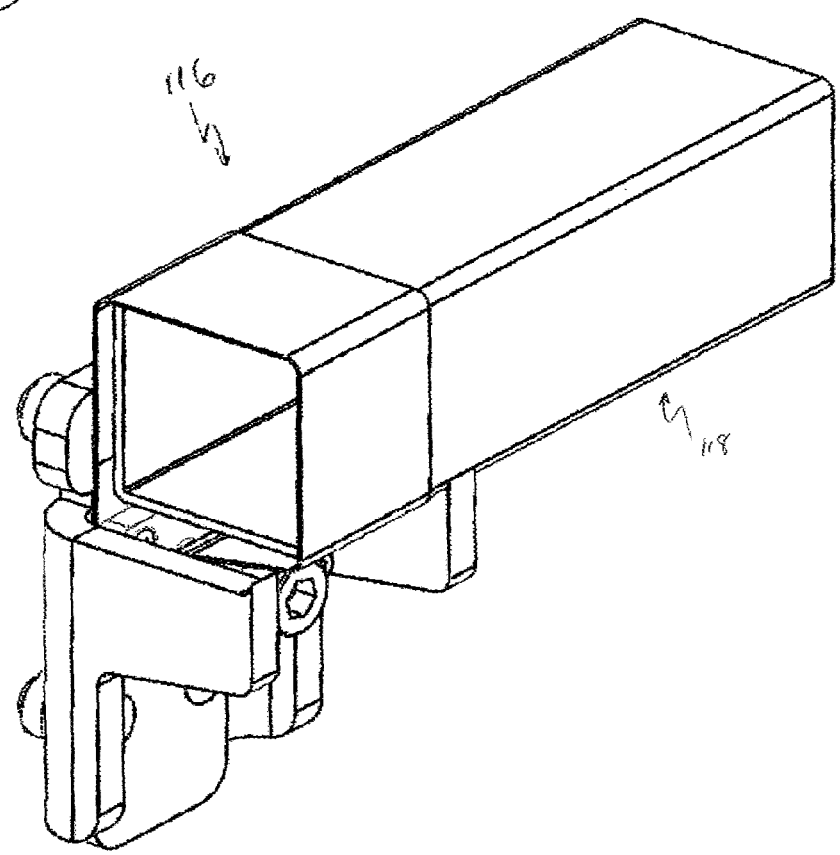
FIG. 34 is a perspective view of the bracket of FIG. 24 and the rail of FIG. 32 secured thereto.
Figure 40:
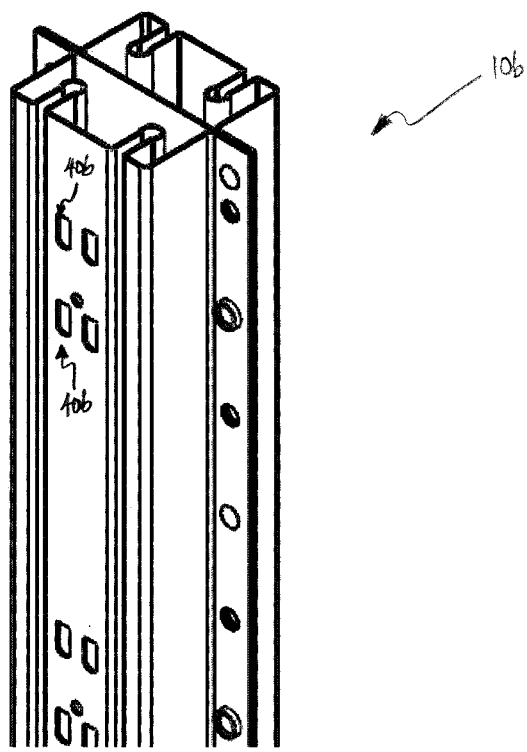
FIG. 40 is a perspective view of another embodiment of an elongate structural element.
Figure 41:
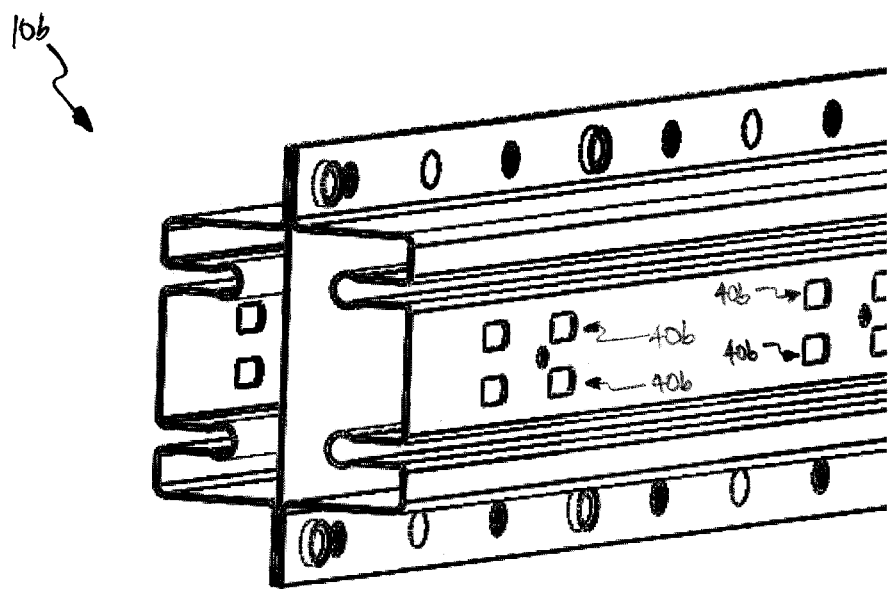
FIG. 41 is another perspective view of the elongate structural element of FIG. 40.
Figure 42:
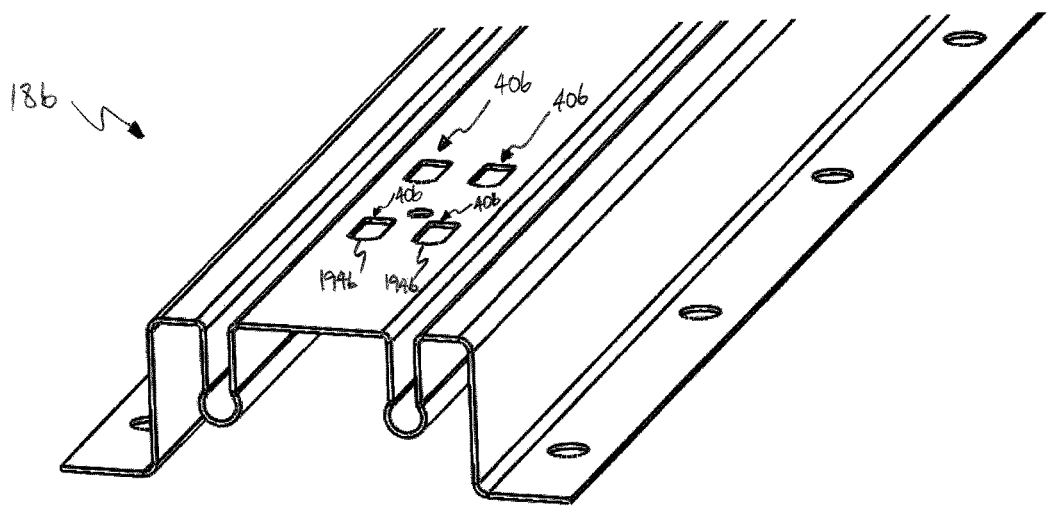
FIG. 42 is a first outer section of the elongate structural element of FIG. 40.
Figure 43:
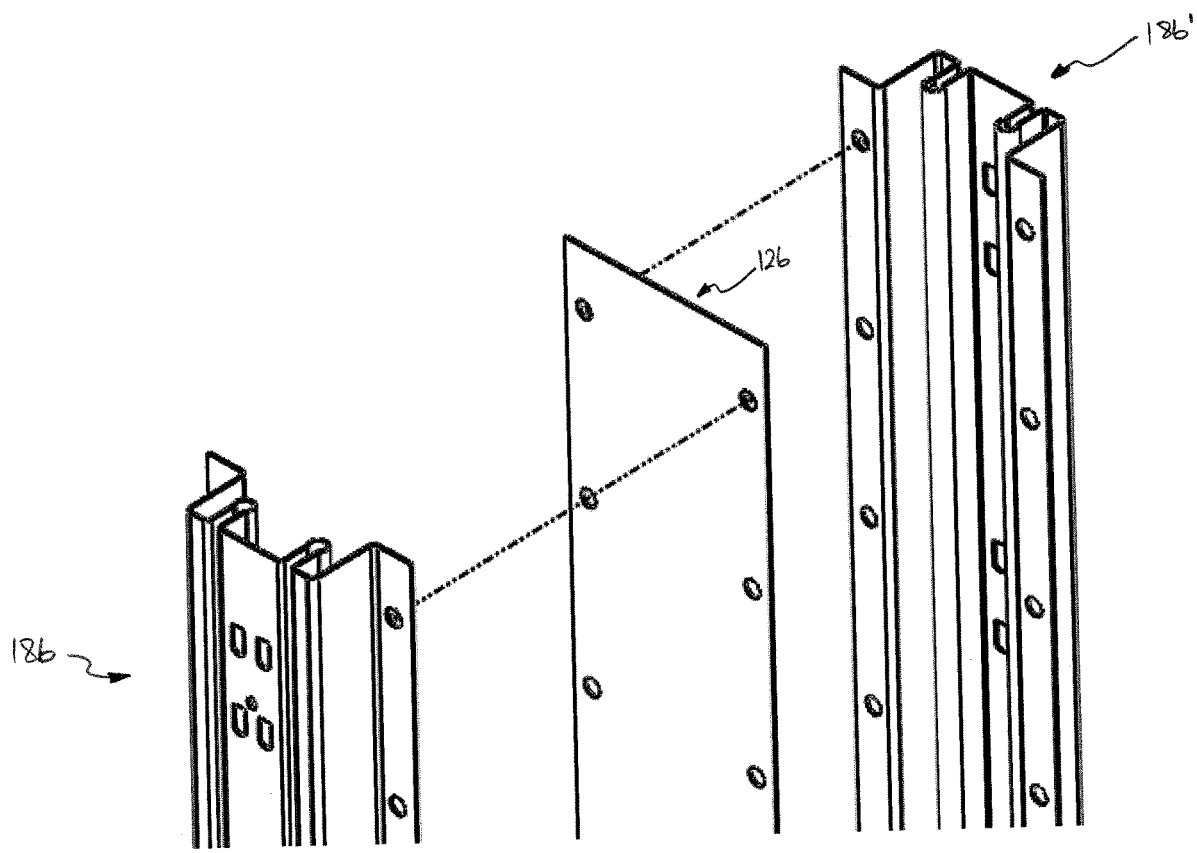
FIG. 43 is an exploded view of the elongate structural element of FIG. 40.
Figure 44:
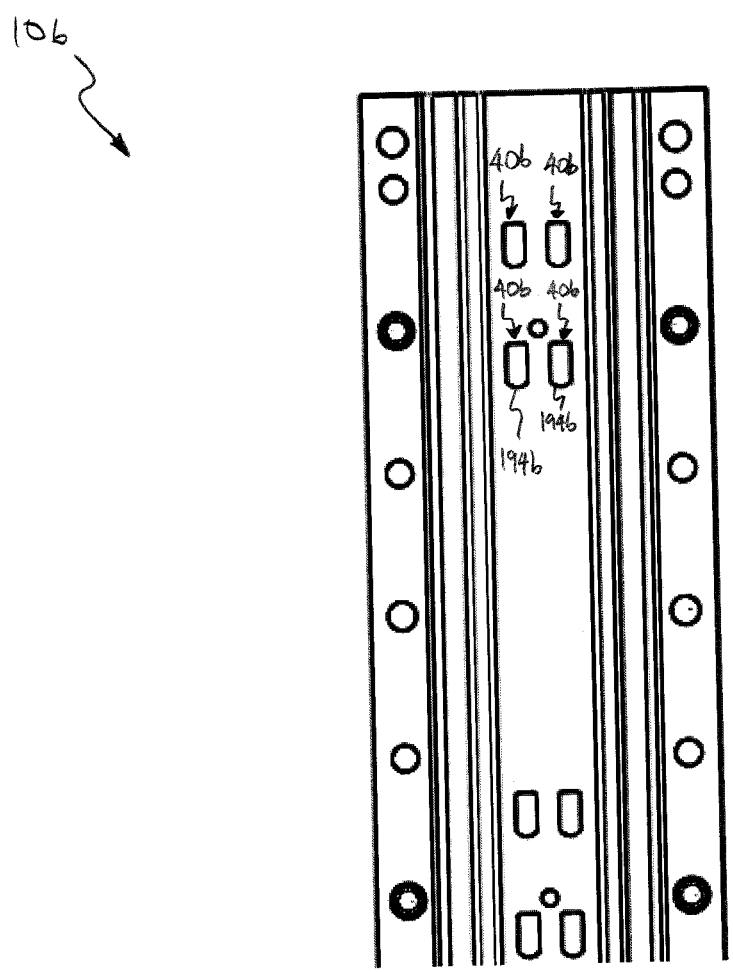
FIG. 44 is a top view of the elongate structural element of FIG. 40.

As best seen in FIGS. 30 to 32, the strap 140 is then flexed into an open configuration allowing the rail 118 to be placed and supported on the shoulder (i.e. abutted on the surfaces 126 of the arm members 122, 124). As best seen in FIGS. 33 and 34, the strap 140 is then allowed to move into the closed configuration such that the rail 118 is within the aperture 141 and substantially wrapped by the strap 140. The bolt 156 is then sequentially passed through the apertures 151, 144, 138. As best seen in FIG. 25, the bolt 156 will protrude from the plate 120 and therefore pass through the locating aperture 46 of the element 10 such that the location of the bracket 116 in relation to the element 10 is fixed. In order to adjust the tension applied on the strap 140 and therefore adjust the constriction on the rail 118, the bolt 156 is rotated and engaged with the threaded aperture 138 of the plate 120 to adjust the distance between the first end 142 and second end 144.

An advantage of the bracket 116 is that the rail 118 can be easily connected to the element 10 without the need for highly skilled technicians.

Another advantage of the bracket 116 is that all connections with the element 10 and the rail 118 are not permanent and easily disconnected. Therefore, the bracket 116, the element 10 and the rail 118 can be readily reused.

Another advantage of the bracket 116 is that the strap 140 is substantially thin such that it does not interfere with other components attached to the rail 118.

It will be appreciated that, in other embodiments, the bracket 116 may be for connecting a rectangular or circular tube rail to the element 10. In such embodiments, the strap 140 would be configured to define a rectangular or circular shaped aperture 141 to correspond to that rail.

FIG. 35 shows an embodiment of an elongate structural section 160 for renovating an existing building and/or installing a facade to a building wall. The section 160 is formed from a sheet of steel with a thickness of 1 mm. It will be appreciated, however, that the section 160 may be formed from a sheet of aluminium, plastic, carbon fibre, or a combination thereof. It will also be appreciated that, in other embodiments, the thickness of the section 160 may be formed from a sheet with a thickness of 1.6 mm or 2 mm. The section 160 is a top hat section that comprises a central wall 162, a pair of side walls 164, 166, and a pair of flanges 168, 170. The side walls 164, 166 respectively extend from the central wall 162 such that a generally U-shaped channel 172 is defined. The flanges 168, 170 respectively extend outwardly from the side walls 164, 166 such that the flanges 168, 170 are aligned to each other and perpendicular to the side walls 164, 166.

The central wall 162 has first 174 and second ends 176. The first end 174 has a male portion 178 that is substantially trapezoidal in shape. The second end 176 has a female portion 180 in the form of a recess that corresponds to the shape of the male portion 178. As shown in FIG. 36, the female portion 180 of the section 160 is able to fittingly receive the male portion 178 of another section 160' such that the section 160 is longitudinally attached and aligned with the section 160'. This allows a plurality of sections 160 to be easily interconnected in longitudinal alignment without the need for skilled technicians.

The central wall 162 comprises a plurality of generally keyhole shaped apertures 182, each with a narrowed region 184 and an enlarged region 186. In each keyhole aperture 182, the narrowed region 184 extends from the enlarged region 186 parallel to the longitudinal axis of the section 160. The narrowed regions 184 of the keyhole apertures 182 respectively extend from the enlarged regions 186 in generally the same direction towards the second end 176. The keyhole apertures 182 are arranged in groups of 4 and the groups are equally spaced along the length of the section 160. In each group, the keyhole apertures 182 are arranged in a generally rectangular shape with a keyhole aperture 182 in each corner. The central wall 162 further comprises a plurality of generally circular locating apertures 188 located generally in the centre of each group of keyhole apertures 182.

It will be appreciated that, in other embodiments, the narrowed regions 184 may respectively extend from the enlarged regions 186 at an angled between 0 to 90 degrees with the longitudinal axis of the section 160.

The section 160 further includes a plurality of first and second circular apertures 190, 192. Each of the first apertures 190 extend through the flange 168 and are equally spaced apart along the length of the section 160. Each of the second apertures 192 extend through the flange 170 and are equally spaced apart along the length of the section 160.

The operation of securing the bracket 116 to the section 160 will now be described.

As shown in FIGS. 37 to 39, the slot pins 132 of the bracket 116 are inserted and locked into a group of keyhole apertures 182 of section 160. Specifically, the enlarged end portion 136 of each slot pin 132 is inserted into the enlarged region 186 of a respective keyhole aperture 182. The bracket 116 is then moved so that the narrowed portions 134 of the slot pins 132 are received into the narrowed regions 184 of the keyhole apertures 182. This will lock the bracket 116 such that lateral movement in relation to the section 160 is prevented. Also, this will substantially align the apertures 138, 144, 148, 151, 153, 155 with a locating aperture 188 of the section 160 such that the bolt 156 can be received therethrough.

FIGS. 40 to 44 show another embodiment of an elongate structural element 10b. With the exception of the differences described below, it will be appreciated that this embodiment of the elongate structural element 10b is substantially similar to the embodiment of the elongate structural element 10 as described above. Accordingly, reference numerals used to denote components of the elongate structural element 10 will also be used to denote like components of the elongate structural element 10b, with only the corresponding alphabetic reference being changed. For example, the reference number 18b will denote a first outer section of the elongate structural element 10b.

In this embodiment, instead of being keyhole shaped, each of the apertures 40b of the elongate structural element 10b is substantially rectangular in shape with an arcuate side 194b.

FIGS. 47 to 51 show another embodiment of a bracket 116a. With the exception of the differences described below, it will be appreciated that this embodiment of the bracket 116a is substantially similar to the embodiment of the bracket 116 as described above. Accordingly, reference numerals used to denote components of the bracket 116 will also be used to denote like components of the bracket 116a, with only the corresponding alphabetic reference being changed. For example, the reference number 140a will denote a strap of the bracket 116a.

Figure 49:
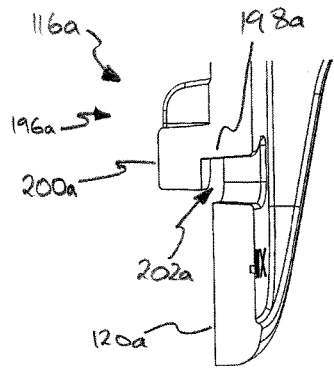
FIG. 49 is an enlarged partial cross-sectional view of the bracket of FIG. 47.
Figure 50:
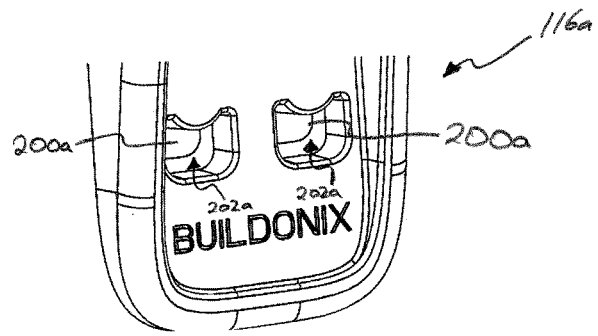
FIG. 50 is an enlarged partial view of the bracket of FIG. 47.

In this embodiment, the bracket 116a is for connecting a square tube rail (not shown) to the element 10b such that the rail is perpendicular to the element 10b. The body 119a of the bracket 116a is formed by cast metal or cast plastic. Instead of comprising four button stud slot pins 132 as seen in bracket 116, the bracket 116a comprises four protrusions 196a arranged in a generally rectangular shape with one protrusion 196a in each corner. As best seen in FIGS. 49 and 50, each protrusion 196a has a first part 198a extending outwardly from the plate 120a in an opposite direction to the arm member 122a, 124a and a second part 200a extending downwardly from a free end of the first part 198a. In each protrusion 196a, the first part 198a and the second part 200a define a recess 202a therebetween.

Figure 52:
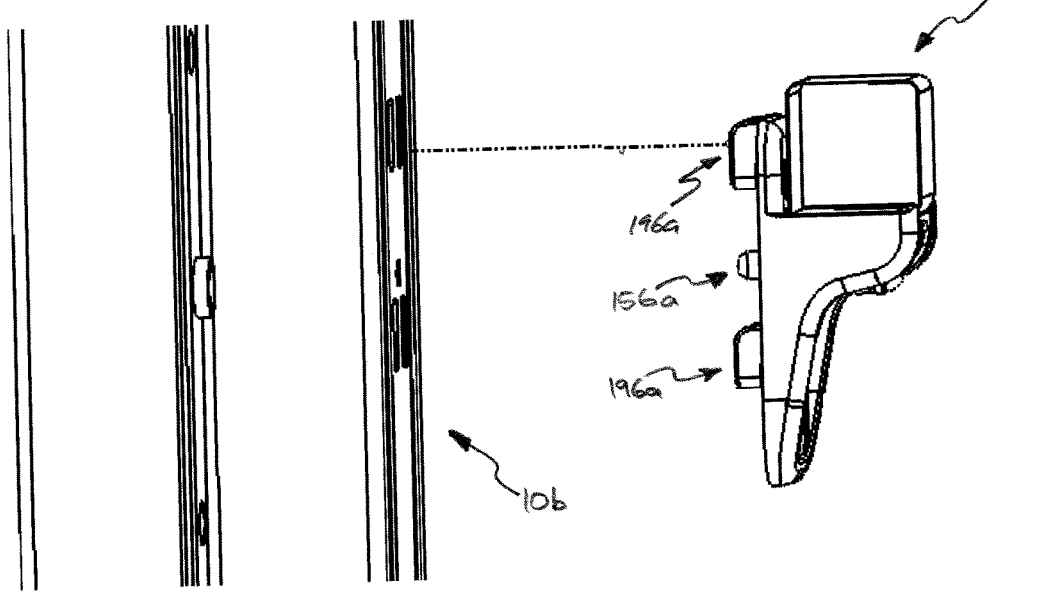
FIG. 52 is an exploded view of a bracket connection of the bracket of FIG. 47 and the elongate structural element of FIG. 40.
Figure 53:
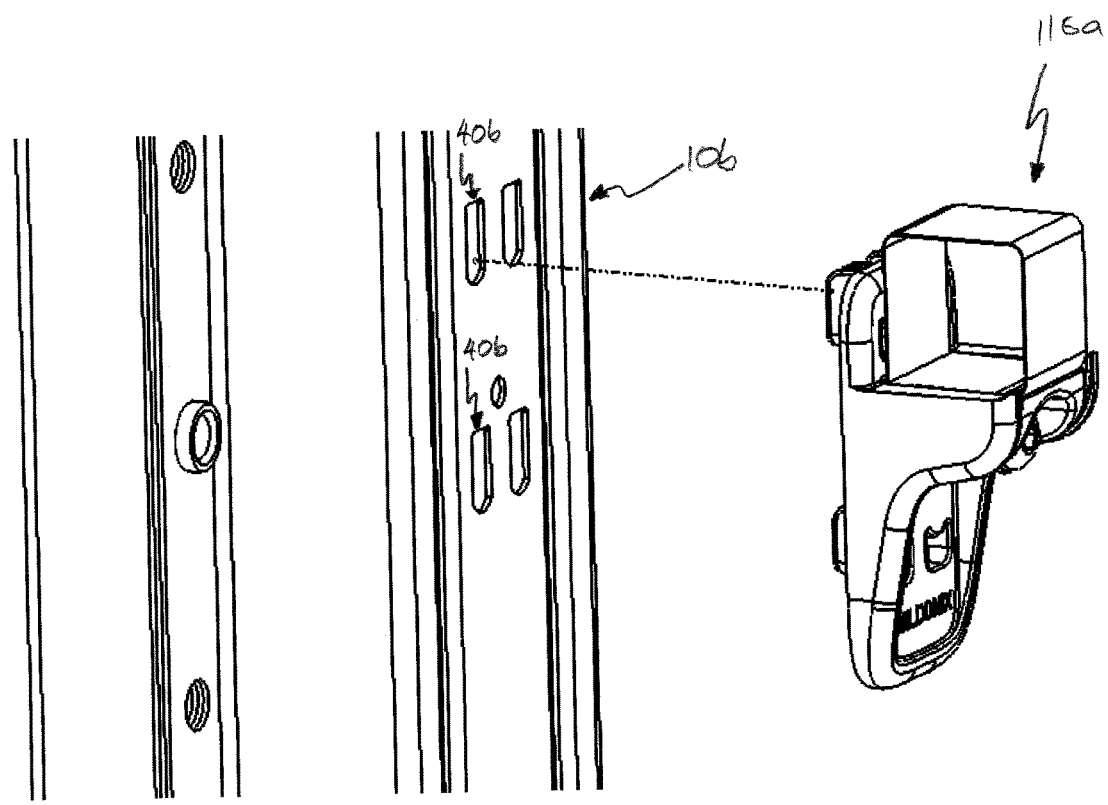
FIG. 53 is another exploded view of the bracket connection of FIG. 52.
Figure 54:
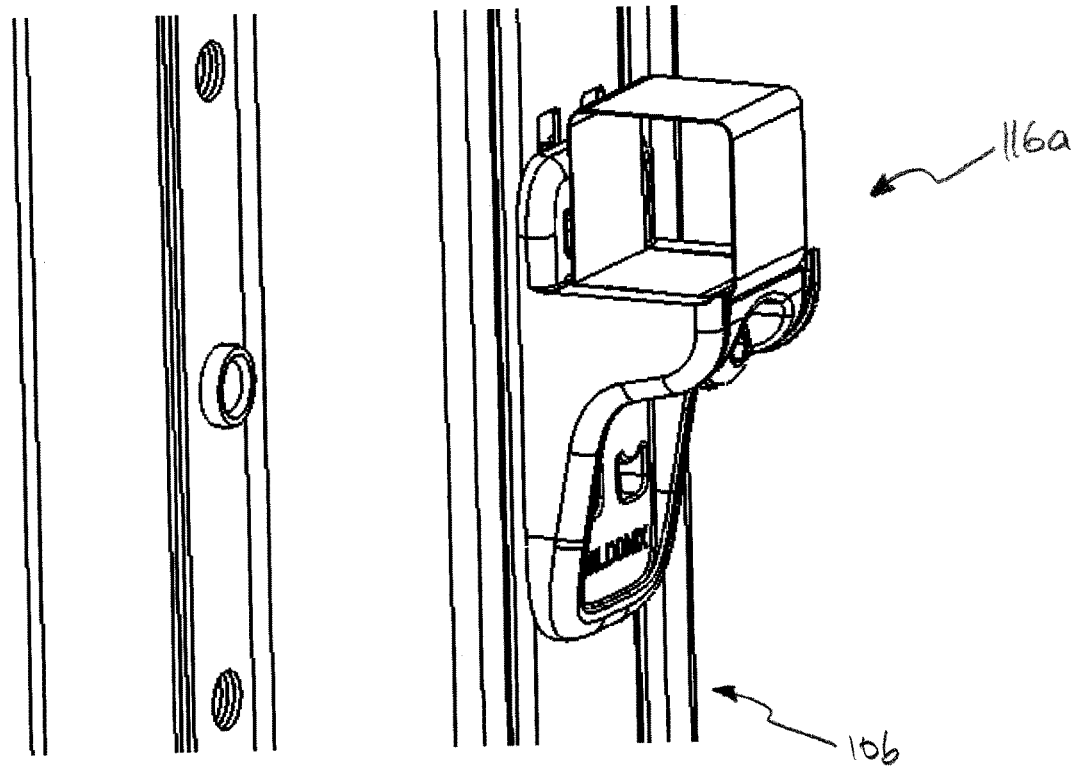
FIG. 54 is a perspective view of the bracket connection of FIG. 52.

As best seen in FIGS. 52 to 54, the periphery of each protrusion 196a generally corresponds to the shape of an aperture 40b of the element 10b. To connect the bracket 116a to the element 10b, the protrusions 196a of the bracket 116b are inserted into a group of apertures 40b of the element 10b as shown in FIGS. 52 and 53. Then, as best seen in FIG. 54, the bracket 116a is longitudinally moved in relation to the element 10b towards the arcuate sides 194b of the apertures 40b such that portions of the central wall 20b are received within the recesses 202a defined by the protrusions 196a. This will lock the bracket 116a such that lateral movement in relation to the element 10 is substantially prevented.

Figure 47:
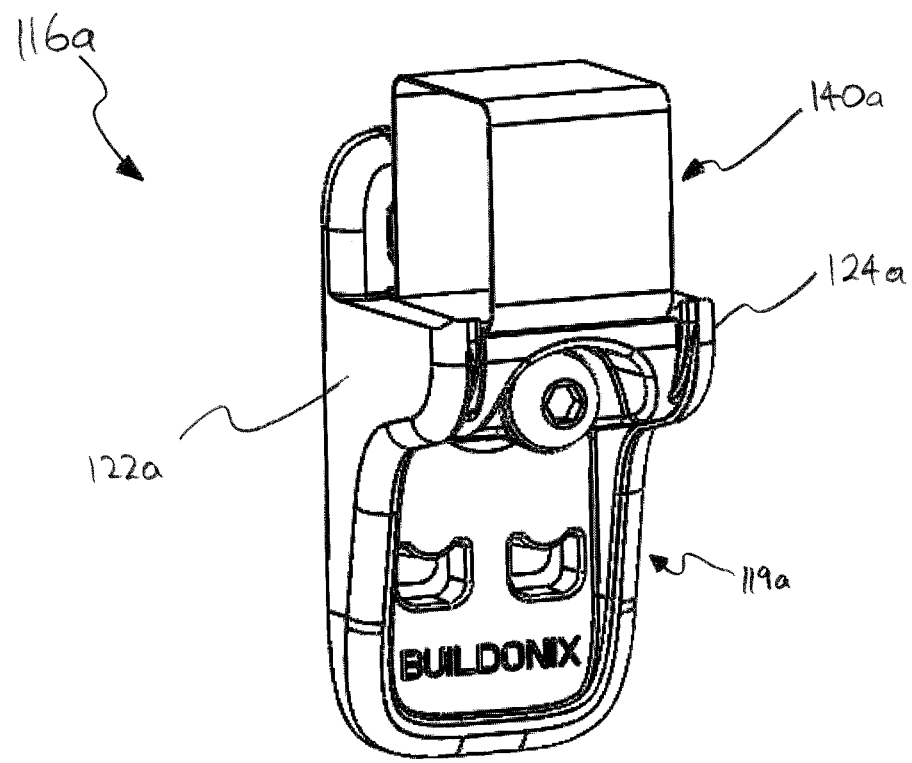
FIG. 47 is a perspective view of another embodiment of a bracket in a closed configuration.
Figure 48:
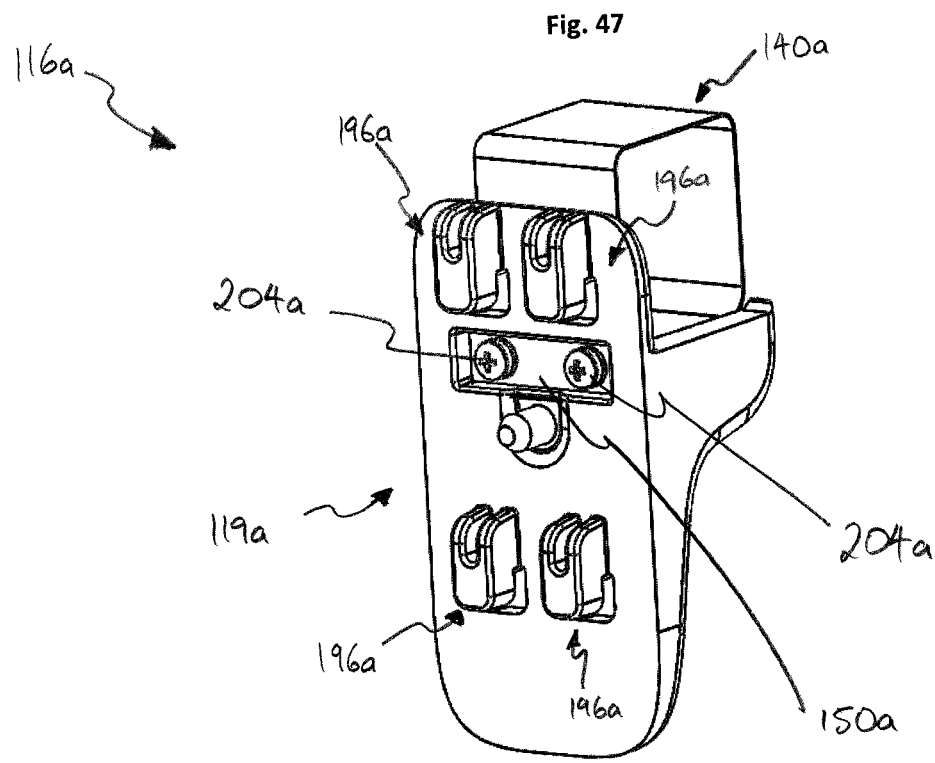
FIG. 48 is another perspective view of the bracket of FIG. 47.
Figure 51:
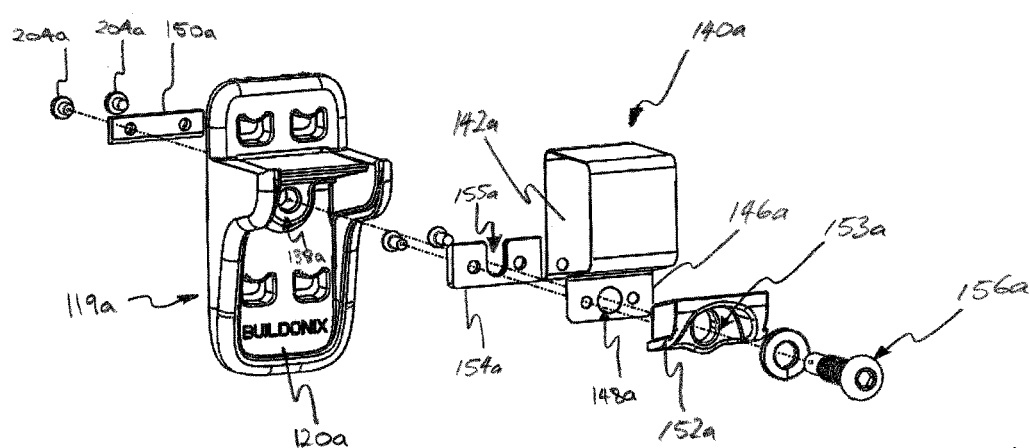
FIG. 51 is an exploded view of the bracket of FIG. 47.

As best seen in FIGS. 48 and 51, the first end 142a of the strap 140a is secured to the body 119a above the aperture 138a by screws 204a and the pressure plate 150a. The pressure plates 152a, 154a are attached to the second end 146a so that the second end 146a is sandwiched therebetween. Each of the pressure plates 152a, 154a has an aperture 153a, 155a that is substantially aligned with the aperture 148a of the second end 146a such that the bolt 156a is able to pass therethrough. In the closed configuration as seen in FIG. 47, the bolt 156a passes through the apertures 153a, 148a, 155a and the threaded aperture 138a of the plate 120a.

Although the disclosure has been described with reference to particular embodiments, it will be appreciated by those skilled in the art that the disclosure may be embodied in many other forms.

What is claimed is:

1. A bracket to connect a rail to an elongate structural element, the bracket including:
   a body configured to attach to the elongate structural element, the body defining a plate and two arm members extending outwardly from the plate, the plate having a plate aperture, the arm members having a surface perpendicular to the plate which defines a shoulder for supporting the rail thereon, wherein the surface of the shoulder is transverse with respect to the plate;
   a strap configured to wrap around the rail, the strap having first and second ends the first and second ends having first and second apertures configured to be aligned, the first end being secured to the body; and
   a bolt configured to extend through the first and second apertures and through the plate aperture to attach the second end to the body and also to fix the location of the body relative to the elongate structural element,
   wherein the body comprises at least one protrusion to engage with a corresponding aperture of the elongate structural element, when the bracket is connected to the rail.

2. The bracket according to claim 1, wherein the bolt is further configured for adjusting a distance between the first end and the second end to adjustably apply tension to the strap.

3. The bracket according to claim 1, wherein the bolt is receivable into an aperture of the elongate structural element.

4. The bracket according to claim 1, wherein the strap comprises a sheet-like material.

5. The bracket according to claim 4, wherein the sheet-like material has a thickness between 0.05 to 0.5 mm.

6. The bracket according to claim 5, wherein the thickness of the sheet-like material is between 0.125 to 0.33 mm.

7. The bracket according to claim 4, wherein the sheet-like material is formed from a metal.

8. The bracket according to claim 1, wherein, when the second end is attached to the body by the bolt, the strap defines a rail aperture for holding the rail therein.

9. The bracket according to claim 8, wherein the rail aperture is configured to correspond with an outer profile of the rail.

10. The bracket according to claim 9, wherein the profile of the rail aperture is generally square, rectangular, or circular shaped.

11. The bracket according to claim 1, wherein the body comprises a plate and at least one arm member extending outwardly therefrom defining the shoulder.

12. The bracket according to claim 11, wherein the arm member has a surface for abutment with the rail, the surface being substantially perpendicular to the plate.

13. The bracket according to claim 11, wherein the arm member is integrally formed with the plate.

14. The bracket according to claim 11, wherein the plate comprises two end portions and the surface of the arm member is located between the two end portions.

15. The bracket according to claim 11, wherein the body comprises two of said arm members.

16. The bracket according to claim 1, wherein the protrusion is a slot pin comprising a narrow portion and an enlarged end portion.

17. The bracket according to claim 1, wherein the protrusion comprises a first part extending from the plate and a second part extending from a free end of the first part to define a recess therebetween for receiving a portion of the elongate structural element.

18. The bracket according to claim 1, wherein the protrusion is integrally formed with the body of the bracket.

* * * * *